(12) United States Patent
Imai

(10) Patent No.: US 6,268,614 B1
(45) Date of Patent: Jul. 31, 2001

(54) ELECTROSTATIC RECORDING MEMBER, ELECTROSTATIC LATENT IMAGE RECORDING APPARATUS, AND ELECTROSTATIC LATENT IMAGE READ-OUT APPARATUS

(75) Inventor: Shinji Imai, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/136,739

(22) Filed: Aug. 19, 1998

(30) Foreign Application Priority Data

Aug. 19, 1997 (JP) .................................................. 9-222114
Jul. 30, 1998 (JP) ................................................. 10-215378

(51) Int. Cl.[7] ........................................................ G01T 1/16
(52) U.S. Cl. ............................................................. 250/591
(58) Field of Search .............................. 250/591, 370.01, 250/370.08, 370.09, 370.12, 370.11, 580; 378/25, 31; 257/431; 430/57.8, 58.1, 59.1

(56) References Cited

U.S. PATENT DOCUMENTS

| | | | |
|---|---|---|---|
| 4,176,275 | 11/1979 | Korn et al. | 250/213 |
| 4,426,434 | * 1/1984 | Arishima et al. | 450/128 |
| 4,508,966 | * 4/1985 | Oberschmid et al. | 250/327.2 |
| 4,521,808 | * 6/1985 | Ong et al. | 358/111 |
| 4,535,468 | 8/1985 | Kempter | 378/31 |
| 4,542,405 | * 9/1985 | Arnold et al. | 358/111 |
| 4,547,670 | * 10/1985 | Sugimoto et al. | 250/370 |
| 4,663,526 | * 5/1987 | Kamieniecki | 250/315.3 |
| 4,778,985 | * 10/1988 | Modisette et al. | 250/213 R |
| 4,818,857 | * 4/1989 | Micheron et al. | 250/213 R |
| 4,961,209 | 10/1990 | Rowlands et al. | 378/29 |
| 5,113,077 | * 5/1992 | Shimizu et al. | 250/370.11 |
| 5,268,569 | 12/1993 | Nelson et al. | 250/214 |
| 5,354,982 | 10/1994 | Nelson et al. | 250/214 |
| 5,556,716 | * 9/1996 | Herron et al. | 428/688 |
| 5,670,291 | * 9/1997 | Ward et al. | 430/132 |
| 5,739,840 | * 4/1998 | Imai | 347/232 |
| 5,759,725 | * 6/1998 | Hirao et al. | 430/58 |

FOREIGN PATENT DOCUMENTS 9-5906    1/1997   (JP) ............................... G03B/42/02

OTHER PUBLICATIONS

Medical Physics, vol. 22, No. 12, Dec. 1995, pp. 1983–1996, "X–ray imaging using amorphous selenium: Photoinduced discharge (PID) readout for digital general radiography", J. A. Rowlands et al.

* cited by examiner

*Primary Examiner*—Constantine Hannaher
(74) *Attorney, Agent, or Firm*—Sughrue, Mion, Zinn Macpeak & Seas, PLLC

(57) ABSTRACT

An electrostatic recording member on which radiation image information is recorded as an electrostatic latent image includes the following layers superposed one on another in this order: a first conductive layer which transmits recording radiations such as X-rays, a recording photoconductive layer which exhibits conductivity upon exposure to the recording radiations passing through the first photoconductive layer, a charge transport layer which substantially acts as an insulator to a charge in the same polarity as a charge placed on the first conductive layer and substantially acts as a conductive body to a charge in the polarity reverse to a charge placed on the first conductive layer, a read-out photoconductive layer which exhibits conductivity upon exposure to a read-out electromagnetic wave, and a second conductive layer which transmits the read-out electromagnetic wave.

80 Claims, 18 Drawing Sheets

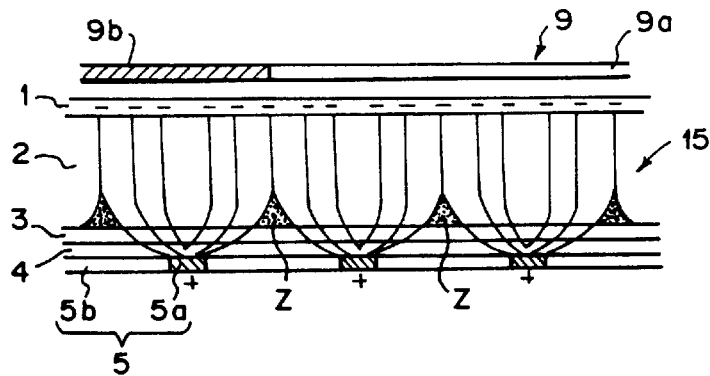
F I G. 12A
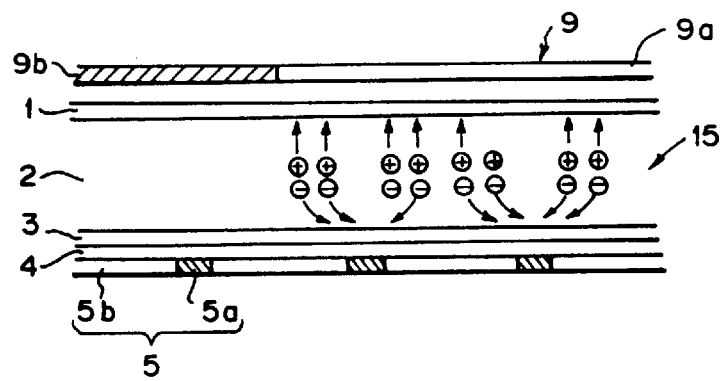
F I G. 12B
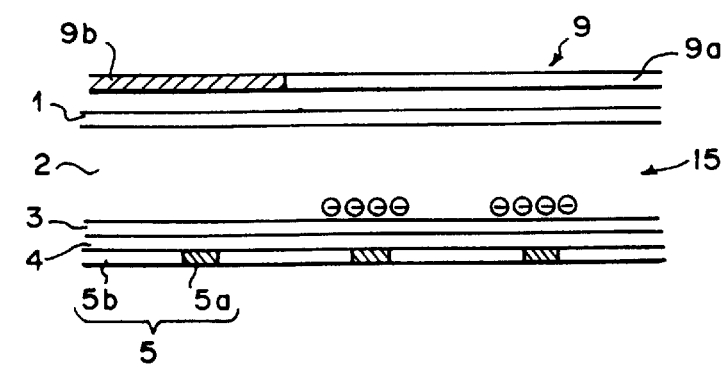
F I G. 12C

F I G. 14
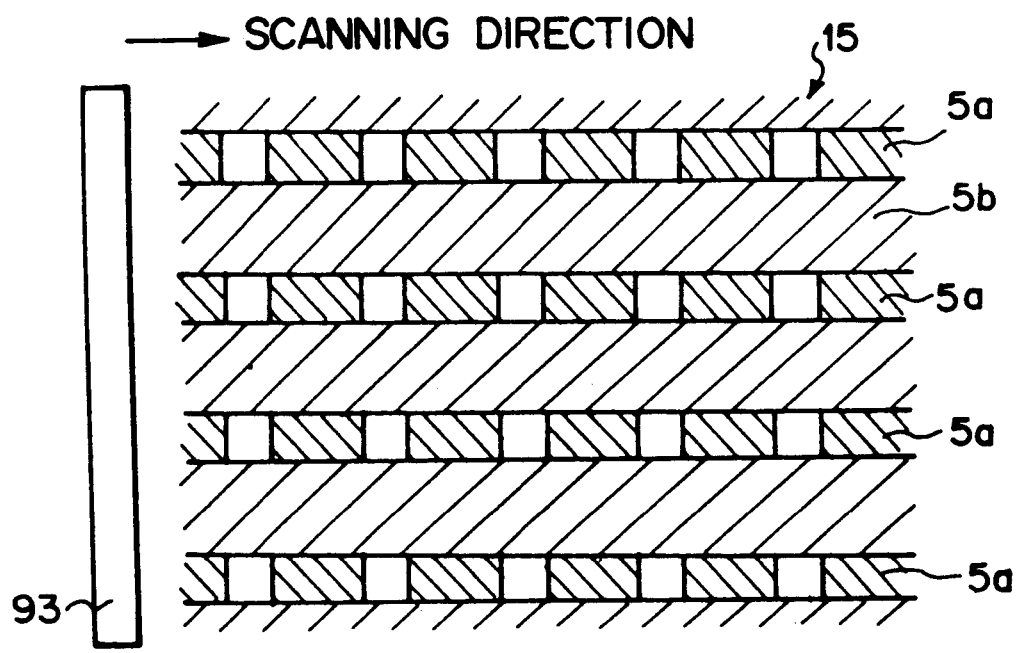

FIG. 16A  FIG. 16B
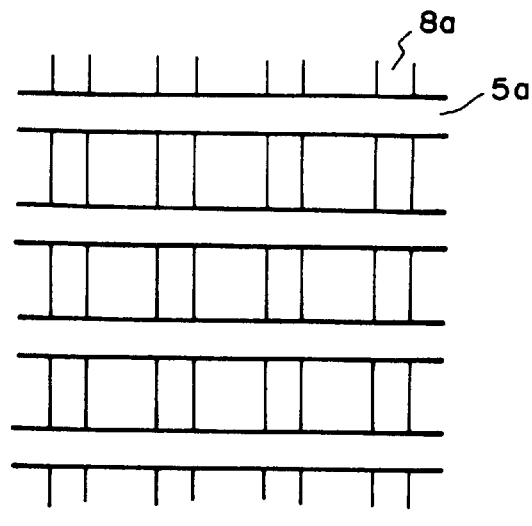
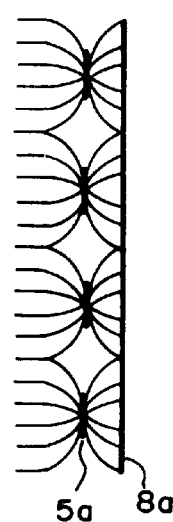
FIG. 16C
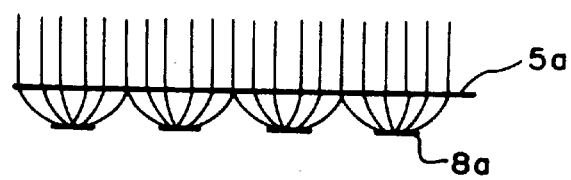
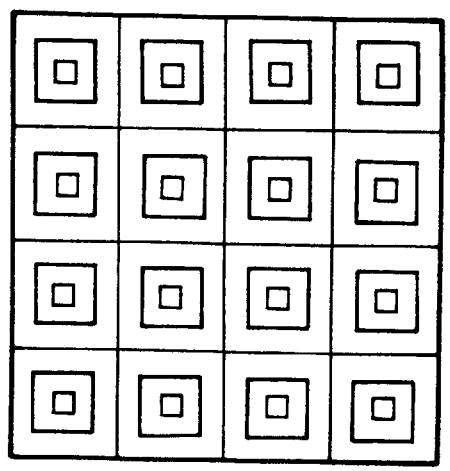
FIG. 16D

FIG.17C

ELECTROSTATIC RECORDING MEMBER, ELECTROSTATIC LATENT IMAGE RECORDING APPARATUS, AND ELECTROSTATIC LATENT IMAGE READ-OUT APPARATUS

BACKGROUND OF THE INVENTION

1. Field of the Invention

This invention relates to an electrostatic recording member on which information on a radiation image obtained by exposing an object to radiation such X-rays, is recorded as an electrostatic charge pattern (an electrostatic latent image), an electrostatic latent image recording apparatus for recording image information on the recording member, and an electrostatic latent image read-out apparatus for reading out image information from the recording member.

2. Description of the Related Art

There has been known an X-raying system in which a photoconductive member such as a selenium plate sensitive to X-rays is employed as a photosensitive member (electrostatic recording member) in order to reduce the dose to the object and to improve diagnostic performance, and the electrostatic latent image formed on the selenium plate by X-rays is read out by use of a laser beam or a plurality of electrodes. See, for instance, U.S. Pat. Nos. 4,176,275, 5,268,569, 5,354,982 and 4,535,468, "23027 Method and device for recording and transducing an electromagnetic energy"; Research Disclosure, June 1983, Japanese Unexamined Patent Publication No. 9(1997)-5906, U.S. Pat. No. 4,961,209, and "X-ray imaging using amorphous selenium"; Med Phys. 22(12).

Such systems are advantageous over a known fluoroscopy using a TV image pickup tube, in that the resolution is higher, and over xeroradiography in that the dosage of X-rays is smaller.

However these systems are disadvantageous in that when the thickness of the selenium plate is increased to compensate for low X-ray absorption of the selenium plate, the image read-out speed is lowered, and they are apt to pick up noise due to geometric accuracy in the direction of thickness of the selenium plate (structure noise).

Further in the systems disclosed in U.S. Pat. Nos. 4,176,275, 5,268,569 and 5,354,982, since the X-ray sensitive photoconductive layer for recording which requires a relatively large thickness of the photoconductive layer is used as the photoconductive layer for read-out, the read-out speed is low, and since a high electric voltage is applied to the photoconductive layer at least until read-out is finished after formation of a latent image, an electric charge due to a dark current is added to the charge of the latent image and the contrast deteriorates in the low dosage area. Further there exists an inherent problem that an erasing process is required for rerecording.

In the systems disclosed in Research Disclosure, June 1983 and Japanese Unexamined Patent Publication No. 9(1997)-5906, the read-out speed is improved by providing a photoconductive layer for read-out separately from that for recording, and the erasing process is unnecessary. However since a high electric voltage is applied to the photoconductive layer until read-out is finished after formation of a latent image (typically for several seconds), an electric charge due to a dark current is added to the charge of the latent image and the contrast deteriorates in the low dosage area.

Further there has been disclosed an approach in which the latent image is read out by short-circuiting the electrodes on the recording side and the read-out side without applying a high voltage upon read-out. However in this approach, a uniform charge distribution is formed in advance by a stored charge on an intermediate interface due to uniform exposure before exposure to X-rays, and a high electric voltage is applied to the photoconductive layer for read-out by the stored charge upon short-circuiting. Accordingly, due to leak of the charge by the dark current, the contrast deteriorates in the low dosage area also in this approach.

Further in the systems disclosed in Research Disclosure, June 1983 and Japanese Unexamined Patent Publication No. 9(1997)-5906, a flood light source for primary exposure is required, which adds to the cost and the size of the apparatus, and it is difficult to realize uniform flood lighting and it is difficult to time the flood lighting to X-raying.

In U.S. Pat. No. 4,535,468, there is disclosed a system comprising a three-layer electrostatic recording member consisting of an X-ray sensitive photoconductive layer, a photoconductive layer for read-out and an intermediate layer on which an electric charge is stored as a trap. In this system, a latent image charge is stored on the intermediate layer by exposing the X-ray sensitive photoconductive layer to X-rays while applying a high electric voltage thereto and then the latent image is read out by short-circuiting the electrodes. In this system, the read-out speed can be increased by use of a thin photoconductive layer for read-out. Further since the high electric voltage is removed after the X-ray latent image is stored on the intermediate layer and short-circuiting is held during read-out, though the latent image charge leaks (attenuates) due to a dark current, the leak is proportional to the amount of the latent image charge unlike the aforesaid system, whereby deterioration in the contrast in the low dosage area can be suppressed.

However since a high electric voltage is generally kept applied for a long time even prior to exposure to recording X-rays, an offset charge component due to a dark current generated by the high electric voltage applied before exposure to the recording X-rays remains and cannot be removed. Further there is a problem that the amount of the signal charge which can be detected from the exterior is small since the photoconductive layer for read-out is smaller in thickness than the X-ray sensitive photoconductive layer. Further since the mobility of charge is low for both electrons and holes in the intermediate layer, the intermediate layer cannot be large in thickness. This is because a high mobility of charge can result in deterioration in response and/or generation of an afterimage. That is, in this system, it is difficult to simultaneously obtain a high response, a large charge storage ability and efficient taking up of the signal charge.

In any of the aforesaid systems, since recording is effected by scanning the electrostatic recording member with a beam spot such as of a laser beam, places where latent image charges are stored, i.e., positions of pixels, cannot be fixed and it is difficult to effect so-called structure noise correction.

SUMMARY OF THE INVENTION

In view of the foregoing observations and description, the primary object of the present invention is to provide an electrostatic recording member which allows even a read-out apparatus of a simple structure to read out a latent image in a shorter time (increase in the read-out speed) and to ensure a high S/N ratio while keeping a high sharpness.

Another object of the present invention is to provide an apparatus for recording image information on such an electrostatic recording member.

Still another object of the present invention is to provide an apparatus for reading out image information from such an electrostatic recording member.

An electrostatic recording member in accordance with a first aspect of the present invention is for recording radiation image information as an electrostatic latent image and is basically formed by sandwiching a charge transport layer which acts as a conductive body only for a charge of one polarity between a recording photoconductive layer and a read-out photoconductive layer so that radiation image information is recorded as an electrostatic latent image by storing a charge on the interface of the recording photoconductive layer and the charge transport layer.

That is, in accordance with the first aspect of the present invention, there is provided an electrostatic recording member comprising a first conductive layer which transmits recording radiations such as X-rays, a recording photoconductive layer which exhibits conductivity upon exposure to recording radiation, a charge transport layer which substantially acts as an insulator to a charge in the same polarity as a charge placed on the first conductive layer and substantially acts as a conductive body to a charge in the polarity reverse to a charge placed on the first conductive layer, a read-out photoconductive layer which exhibits conductivity upon exposure to a read-out electromagnetic wave, and a second conductive layer which transmits the read-out electromagnetic wave, superposed one on another in this order.

Preferably the recording photoconductive layer contains as a major component at least one of a—Se, PbO, $PbI_2$, $Bi_{12}(Ge,Si)O_{20}$, and $Bi_2I_3$/organic polymer nanocomposites and is not smaller than 50 μm and not larger than 1000 μm in thickness.

Further preferably the read-out photoconductive layer also exhibits conductivity upon exposure to the recording radiation.

In this specification the "electromagnetic wave" includes light such as infrared rays, visible rays and the like and may be at any wavelength so long as it can be employed in reading out an electrostatic latent image to be described later.

An electrostatic recording member in accordance with a second aspect of the present invention is for recording radiation image information as an electrostatic latent image and is basically formed by sandwiching a charge transport layer which acts as a conductive body only for a charge of one polarity between a recording photoconductive layer and a read-out photoconductive layer and superposing a wavelength conversion layer on the recording photoconductive layer so that radiation such as X-rays is converted to light in a different wavelength range by the wavelength conversion layer and an electrostatic latent image is recorded by exposing the recording photoconductive layer to the wavelength-converted light.

That is, in accordance with the second aspect of the present invention, there is provided an electrostatic recording member comprising a wavelength conversion layer such as an X-ray scintillator which converts recording radiation to visible light in a first wavelength range, a first conductive layer which transmits the visible light, a recording photoconductive layer which exhibits conductivity upon exposure to the visible light passing through the first photoconductive layer, a charge transport layer which is insensitive to light and substantially acts as an insulator to a charge in the same polarity as a charge placed on the first conductive layer and substantially acts as a conductive body to a charge in the polarity reverse to a charge placed on the first conductive layer, a read-out photoconductive layer which exhibits conductivity upon exposure to a read-out electromagnetic wave, and a second conductive layer which transmits the read-out electromagnetic wave, superposed one on another in this order.

Preferably the wavelength conversion layer converts the recording radiation also to visible light in a second wavelength range, and the read-out photoconductive layer exhibits its conductivity upon exposure to the visible light in the second wavelength range.

In each of the electrostatic recording members of the first and second aspects, it is preferred that the read-out photoconductive layer contains as a major component, at least one of a—Se, Se—Te, Se—As—Te, nonmetal phthalocyanine and metallophthalocyanine such as MgPc, VoPc and CuPc.

In each of the electrostatic recording members of the first and second aspects, it is more preferred that the read-out photoconductive layer be a photoconductive layer which exhibits a high sensitivity to an electromagnetic wave in a wavelength range of a near ultraviolet region to a blue region (300 to 550 nm) and a low sensitivity to an electromagnetic wave in a red region (not shorter than 700 nm). Such a preferred read-out photoconductive layer includes, for instance, those containing as a major component at least one of a—Se, $PbI_2$, $Bi_{12}(Ge,Si)O_{20}$, perylene-bis-imide (R=n-propyl), and perylene-bis-imide (R=n-neopentyl).

The read-out photoconductive layer which also exhibits conductivity upon exposure to the recording radiation is preferably a photoconductive layer containing as a major component at least one of a—Se, Se—Te and Se—As—Te.

In each of the electrostatic recording members of the first and second aspects, it is preferred that the charge transport layer contains as a major component at least one of PVK, TPD, dispersion of TPD in polymer, and a—Se doped with 10 to 200 ppm of Cl.

In each of the electrostatic recording members of the first and second aspects, it is preferred that the charge transport layer be larger in the mobility of charge in the direction of thickness of the layer than that in a direction parallel to the layer.

In each of the electrostatic recording members of the first and second aspects, it is preferred that the charge transport layer includes at least a first charge transport layer formed of a material which substantially acts as an insulator to a charge in the same polarity as a charge placed on the first conductive layer and a second charge transport layer formed of a material which substantially acts as a conductive body to a charge in the polarity reverse to a charge placed on the first conductive layer with the first and second charge transport layers superposed so that the first charge transport layer faces toward the recording photoconductive layer and the second charge transport layer faces toward the read-out photoconductive layer. More preferably the first charge transport layer is of an organic material and the second charge transport layer is of a Se series material. Specifically it is preferred that the first charge transport layer be a layer consisting of at least one of PVK and TPD and the second charge transport layer be an a— Se layer doped with Cl of 10 to 200 ppm. In this case, it is preferred that the second charge transport layer is larger in thickness than the first charge transport layer.

In each of the electrostatic recording members of the first and second aspects, it is preferred that a first blocking layer which prevents the charge placed on the first conductive layer from being injected into the recording photoconductive layer be interposed between the first conductive layer and the recording photoconductive layer and/or that a second blocking layer which prevents the charge placed on the second conductive layer from being injected into the read-out photoconductive layer be interposed between the second conductive layer and the read-out photoconductive layer.

Further the sum of the thickness of the read-out photoconductive layer and that of the charge transport layer is preferably not larger than 1/2 of the thickness of the recording photoconductive layer and more preferably not larger than 1/10 of the same, and most preferably not larger than 1/20 of the same.

In each of the electrostatic recording members of the first and second aspects, the mobility in the charge transport layer of a charge in the same polarity as a charge placed on the first conductive layer is preferably not larger than $1/10^2$ and more preferably not larger than $1/10^3$ of the mobility in the charge transport layer of a charge in the polarity reverse to a charge placed on the first conductive layer.

In each of the electrostatic recording members of the first and second aspects, it is preferred that the second conductive layer be in the form of a comb electrode for read-out which is like a comb in shape.

It is further preferred that the width of each tooth of the comb electrode is not larger than 75% of the pitch of the teeth. Further it is preferred that the interspaces between the teeth of the comb electrode be nontransparent to the read-out electromagnetic wave, and it is preferred that the portions of each tooth between pixels arranged in the longitudinal direction of the tooth be nontransparent to the read-out electromagnetic wave.

It is preferred that the sum of the thickness of the read-out photoconductive layer and that of the charge transport layer in the electrostatic recording member provided with the comb electrode be substantially the same as the pitch of the teeth or smaller than the same.

In the electrostatic recording member provided with the comb electrode, it is preferred that an insulating layer and a third conductive layer both of which transmit the read-out electromagnetic wave be superposed on the second conductive layer in this order and the third conductive layer be in the form of a comb electrode for recording whose teeth extend substantially in perpendicular to those of the comb electrode on the second conductive layer.

Further it is preferred that the interspaces between the teeth of the comb electrode on the third conductive layer be nontransparent to the read-out electromagnetic wave and the width of each tooth of the comb electrode of the third conductive layer be not larger than 75% of the pitch of the teeth.

It is preferred that the sum of the thickness of the read-out photoconductive layer and that of the charge transport layer in the electrostatic recording member provided with the comb electrode be substantially the same as the pitch of the teeth of the comb electrode of the third conductive layer or smaller than the same.

In accordance with a third aspect of the present invention, there is provided an electrostatic latent image recording apparatus for recording radiation image information as an electrostatic latent image on an electrostatic recording member in accordance with the first or second aspect of the present invention, comprising a power source which applies a predetermined DC voltage between the first and second conductive layers, and a recording light projecting means which projects recording radiation bearing thereon the radiation image information onto the electrostatic recording member, wherein the radiation image information is recorded as an electrostatic latent image by projecting the recording radiation onto the first conductive layer of the electrostatic recording member to cause the interface of the recording photoconductive layer and the charge transport layer of the electrostatic recording member to store a charge in the same polarity as the charge placed on the first conductive layer.

In accordance with a fourth aspect of the present invention, there is provided an electrostatic latent image recording apparatus for recording radiation image information as an electrostatic latent image on an electrostatic recording member provided with the comb electrode for recording and the third conductive layer, comprising a power source which applies a predetermined DC voltage between the first and third conductive layers, and a recording light projecting means which projects recording radiation bearing thereon the radiation image information onto the first conductive layer, wherein the radiation image information is recorded as an electrostatic latent image by projecting the recording radiation onto the first conductive layer of the electrostatic recording member to cause the interface of the recording photoconductive layer and the charge transport layer of the electrostatic recording member to store a charge in the same polarity as the charge placed on the first conductive layer.

In each of the electrostatic latent image recording apparatuses of the third and fourth aspects, it is preferred that there is provided a pre-exposure means which projects a predetermined amount of electromagnetic radiations onto the second conductive layer before the recording radiation are projected onto the first conductive layer.

In accordance with a fifth aspect of the present invention, there is provided an electrostatic latent image read-out apparatus for reading out an electrostatic latent image from the electrostatic recording member of the present invention, comprising a read-out exposure means which causes a read-out electromagnetic wave to scan the second conductive layer, and an electric current detecting means which detects through the first or second conductive layer an electric current flowing out the electrostatic recording member according to the electrostatic latent image recorded thereon upon exposure to the read-out electromagnetic wave.

In one embodiment, the electrostatic latent image read-out apparatus further comprises a connecting means which connects the first conductive layer selectively to the second conductive layer or the current detecting means, wherein the connecting means first connects the first conductive layer to the second conductive layer to equalize the potential of the second conductive layer to that of the first conductive layer and then connects the first conductive layer to the current detecting means to detect the electric current flowing out the electrostatic recording member.

In the electrostatic latent image read-out apparatus, it is preferred that the read-out electromagnetic wave be in a wavelength range of a near ultraviolet region to a blue region when the read-out photoconductive layer of the electrostatic recording member exhibits a high sensitivity to an electromagnetic wave in a wavelength range of a near ultraviolet region to a blue region (300 to 550 nm) and a low sensitivity to an electromagnetic wave in a red region (not shorter than 700 nm).

It is preferred that read-out exposure means causes a read-out electromagnetic wave in the form of a beam to scan the second conductive layer.

In the case where the electrostatic recording member is provided with a comb electrode for read-out, it is preferred that the read-out exposure means causes a line image of a read-out electromagnetic wave which is substantially uniform in intensity and extends substantially in perpendicular to the teeth of the comb electrode to scan the second conductive layer in the longitudinal direction of the comb teeth, and the current detecting means detects the electric current flowing out the electrostatic recording member tooth by tooth.

Further in the case where the electrostatic recording member is provided with a comb electrode for read-out, it is preferred that the electrostatic latent image read-out apparatus be provided with a second connecting means which connects the second and third conductive layers.

In this case, it is preferred that the read-out exposure means projects the read-out electromagnetic wave like a pulse onto each pixel.

Further it is preferred that the current detecting means comprises an integrating capacitor which stores charge by the electric current flowing to the current detecting means, and a discharge means which selectively discharges the charge stored in the integrating capacitor, thereby detecting the charge stored in the integrating capacitor pixel by pixel. Further it is preferred that the current detecting means is connected to the first conductive layer by way of a bias power source having a predetermined DC voltage. It is further preferred that the bias power source be the power source which is used when recording the electrostatic latent image.

In accordance with the present invention, since the electrostatic recording member is of a three-layer structure comprising a charge transport layer, which acts as a conductive body only to, for instance, a positive charge, sandwiched between a recording photoconductive layer and a read-out photoconductive layer and an electrostatic latent image is recorder by storing a charge on the interface of the photoconductive layers, the electrostatic latent image can be recorded only by electrifying the conductive layers on opposite sides of the three-layer structure at a predetermined potential and projecting recording radiation onto the recording photoconductive layer, and it is unnecessary to place a primary charge on the electrostatic recording member by uniform exposure before recording. Accordingly the exposure means for the uniform exposure can be eliminated, which simplifies the structure of the recording apparatus.

When the conductive layers on opposite sides of the three-layer structure are electrified at the predetermined potential before projecting recording radiation onto the recording photoconductive layer, a dark current generated in the recording photoconductive layer, especially a dark current (e.g., electrons) injected into the recording photoconductive layer from the first conductive layer, reaches the interface of the charge transport layer and the recording photoconductive layer and is stored there. Further a dark current generated in the read-out photoconductive layer, especially a dark current (e.g., holes) injected into the read-out photoconductive layer from the second conductive layer, passes through the charge transport layer and neutralizes the electrons stored on the interface. It is possible to control the condition of the two conductive layers and the two photoconductive layers (e.g., material and thickness) so that the number of the holes reaching the interface is slightly larger than that of the electrons. When the holes are larger than the electrons in number, the excessive holes are injected into the recording photoconductive layer and are drifted to the electrode without accumulating on the interface. With this arrangement, the amount of dark electrons added to the charge of the latent image of the recording radiation in an offset manner can be suppressed very small, whereby a high S/N ratio can be easily obtained.

Further it is possible to control the condition of the two conductive layers and the two photoconductive layers so that the number of the holes reaching the interface is slightly smaller than that of the electrons. When the electrons are larger than the holes in number, the excessive electrons accumulate on the interface. However by uniformly exposing the read-out photoconductive layer to a predetermined amount of electromagnetic wave before projecting the recording radiation, a proper amount of holes can be generated and the excessive electrons can be neutralized. At this time, the excessive holes reach the electrode without accumulating on the interface.

Also in this case, the amount of dark electrons added to the charge of the latent image of the recording radiation in an offset manner can be suppressed very small, whereby a high S/N ratio can be easily obtained.

From the viewpoint of the S/N ratio the latter case is preferred over the former. This is because, in the latter case, the dark resistance of the read-out photoconductive layer is large and fading of the signals before read-out is finished can be prevented.

Also in the case where a residual latent image exists, the latter case is preferred.

Further when some barrier to injection of charge (holes) is formed between the charge transport layer and the recording photoconductive layer, a small amount of holes can accumulate there. However this phenomenon often results in a preferable effect. That is, the band structure of the read-out photoconductive layer is flattened by the holes accumulating at the barrier and the photoelectric effect generated at the contact interface of the light incident side electrode and the photoconductive layer is cancelled, thereby suppressing a noise current.

On the other hand, when reading out the electrostatic latent image recorded on the electrostatic recording member, the read-out electromagnetic wave can be projected from the read-out photoconductive layer side which is relatively thin. Accordingly, the electrostatic latent image can be read out at a high speed under a strong electric field without applying a high electric voltage. Further since there hardly remains charge on the electrostatic recording member after read-out, another latent image can be recorded on the electrostatic recording member without erasing process. This basically eliminates necessity of an exposure means for the erasing process and simplifies the read-out apparatus.

Further when the recording photoconductive layer is 50 $\mu$m to 1000 $\mu$m in thickness, the photoconductive layer can absorb a sufficient amount of recording radiation and accordingly the amount of charge of the latent image can be sufficient, whereby a high S/N ratio can be obtained.

Further when the read-out photoconductive layer also exhibits conductivity upon exposure to the recording radiation, accumulation of excessive charge can be prevented and the dark current which is substantially proportional to accumulating charge can be made small upon read-out of the electrostatic latent image, whereby the S/N ratio of the image read out can be improved.

Further when a wavelength conversion layer is provided to convert radiation such as X-rays to visible light in a different wavelength range and an electrostatic latent image is recorded by exposing the recording photoconductive layer to the wavelength-converted visible light as in the second aspect of the present invention, generating efficiency of charged pairs generated by the visible light in the recording photoconductive layer is increased, and the amount of X-rays to be projected can be reduced, which results in reduction of dosage to the object.

The recording photoconductive layer which exhibits conductivity upon exposure to visible light may be relatively small in thickness and accordingly efficiency in taking up the signal can be increased.

When the wavelength conversion layer converts the recording radiation also to visible light in a second wavelength range different from said wavelength range, and the read-out photoconductive layer exhibits conductivity upon exposure to the visible light in the second wavelength range, accumulation of excessive charge can be prevented and the dark current which is substantially proportional to accumulating charge can be made small upon read-out of the electrostatic latent image, whereby the S/N ratio of the image read out can be improved.

Various photoconductive layers may be employed as the read-out photoconductive layer as described above. However when the read-out photoconductive layer of the electrostatic recording member exhibits a high sensitivity to an electromagnetic wave in a wavelength range of a near ultraviolet region to a blue region (300 to 550 nm) and a low sensitivity to an electromagnetic wave in a red region (not shorter than 700 nm), the band gap is large and generation of a dark current due to heat can suppressed, whereby noise due to a dark current can be reduced.

When the charge transport layer is larger in the mobility of charge in the direction of thickness of the layer than that in a direction parallel to the layer, the charge is apt to move at a high speed in the direction of thickness of the layer and is not apt to move in the horizontal direction, whereby the sharpness can be improved.

When the charge transport layer includes at least a first charge transport layer formed of a material which substantially acts as an insulator to a charge in the same polarity as a charge placed on the first conductive layer (will be referred to as "the latent image charge", hereinbelow) and a second charge transport layer formed of a material which substantially acts as a conductive body to a charge in the polarity reverse to the latent image charge (will be referred to as "the transfer charge", hereinbelow) with the first and second charge transport layers superposed so that the first charge transport layer faces toward the recording photoconductive layer and the second charge transport layer faces toward the read-out photoconductive layer, the second charge transport layer contributes to transferring the transfer charge at a high speed and the first charge transport layer acts as a strong insulator to the latent image charge, whereby the charge transport layer can be optimal.

The charge transport layer may comprise three or more layers. In this case, the layers should be arranged in the order of insulating force to the latent image charge and the conductivity to the transfer charge so that the insulating force to the latent image charge becomes stronger toward the recording photoconductive layer and the conductivity to the transfer charge becomes higher toward the read-out photoconductive layer.

By selecting the material of the charge transport layer and/or employing a multiple-layer structure, the mobility of the transfer charge can be increased and accordingly the thickness of the charge transport layer need not be limited, whereby a high response and a large charge storage ability can be simultaneously obtained. Further since trap of the carriers on the charge transport layer can be made small, an afterimage is not apt to remain even if the charge transport layer is larger in thickness.

When a blocking layer is interposed between the first conductive layer and the recording photoconductive layer and/or between the second conductive layer and the read-out photoconductive layer, injection of charge into the recording photoconductive layer or the read-out photoconductive layer from the conductive layer which can generate a noise component in the image read out can be prevented. Further by properly selecting the material, the thickness and the like of the blocking layer, injection of charge from the respective conductive layers can be effectively balanced and the S/N ratio of the image read out can be improved.

When the sum of the thickness of the read-out photoconductive layer and that of the charge transport layer is smaller than the thickness of the recording photoconductive layer (e.g., not larger than 1/2, not larger than 1/10, and not larger than 1/20 of the thickness of the recording photoconductive layer), the electrostatic latent image (stored charge) can be read out under a strong electric field, and accordingly, can be read out at a high speed.

When the mobility in the charge transport layer of the charge to be stored as an electrostatic latent image is sufficiently smaller than the charge in the polarity reverse thereto (e.g., not larger than $1/10^2$ and more preferably not larger than $1/10^3$), the charge can be more surely stored and retainability of the electrostatic latent image can be improved.

Further when the second conductive layer on the read-out photoconductive layer is in the form of a comb electrode, the stored charge can be concentrated on the teeth of the electrode and the stored charge is separated by the teeth, whereby the sharpness of the electrostatic latent image can be improved in the direction of the row of the teeth. In this case, when the sum of the thickness of the read-out photoconductive layer and that of the charge transport layer is substantially the same as the pitch of the teeth, which corresponds to the pixel pitch, or smaller than the same, the sharpness of the electrostatic latent it image can be further improved.

Further the comb electrode for read-out reduces the area of the read-out electrode and the effective capacity formed between the read-out electrode and the interface where the electrostatic latent image is formed (with the read-out photoconductive layer and the charge transport layer intervening therebetween) is reduced. On the other hand, the capacity formed between the recording electrode and the interface (intervening therebetween the recording photoconductive layer) is hardly affected. As a result, the signal taking efficiency can be increased though the thickness of the charge transport layer and the read-out photoconductive layer is smaller than that of the recording photoconductive layer.

Further since a read-out exposure means which causes a line image of a read-out electromagnetic wave which is substantially uniform in intensity can be used, the read-out exposure means may be simple in structure. Since the comb electrode for read-out reduces the area of the read-out electrode, the distributed capacity can be small and influence of noise can be suppressed. Further the pixel pitch can be fixed to the teeth pitch of the comb electrode and image data on the electrostatic latent image read out can be corrected depending on the arrangement of the teeth, whereby structure noise can be corrected.

The strength of the electric field during read-out is concentrated on the teeth, which increases the effective strength of the electric field and promotes separation of the electric field, whereby the sharpness and the intensity of the signals upon read-out can be increased. This effect is especially increased when the width of each tooth of the comb electrode is not larger than 75% of the pitch of the teeth. When the portions of each tooth between pixels arranged in the longitudinal direction of the tooth is nontransparent to the read-out electromagnetic wave, the line image of the recording radiation can be converted to a spot image, whereby the image can be read out a higher sharpness. Further when the sum of the thickness of the read-out photoconductive layer and that of the charge transport layer is substantially the same as the pitch of the teeth or smaller than the same, portions where substantially no electric field exists can be clearly formed on the interface of the recording photoconductive layer and the charge transport layer, whereby the sharpness can be further improved.

When a comb electrode for recording those teeth extend substantially in perpendicular to those of the comb electrode for read-out is provided, the electric field distribution is concentrated on the intersections of the teeth of the comb electrodes for recording and read-out and the charges are concentrated on the intersections, whereby an electrostatic latent image which is high in sharpness also in the longitudinal direction of teeth can be recorded. Further the capacity of the charge transport layer and the read-out photoconductive layer can be effectively reduced and the signal taking efficiency upon read-out can be increased. By making the width of each tooth of the comb electrode not larger than 75% of the pitch of the teeth and/or making nontransparent the interspaces between the teeth of the comb electrode for recording, this effect is further increased.

Since the electrostatic latent image recording apparatus of the present invention is for recording an electrostatic latent image on the aforesaid electrostatic recording member, it can record an electrostatic latent image only by electrifying the conductive layers on opposite sides of the three-layer structure, i.e., the recording photoconductive layer, the charge transport layer and the read-out photoconductive layer, at a predetermined potential. Accordingly it may be very simple in structure. Especially even when recording an electrostatic latent image on the electrostatic recording member provided with a comb electrode for recording, the electrostatic latent image recording apparatus need not be modified but can record the electrostatic latent image by simply changing the electrode to which it applies an electric voltage. By such a simple operation, the sharpness can be greatly improved in the longitudinal direction of the teeth.

By projecting a predetermined amount of electromagnetic radiation onto the second conductive layer before the recording radiation is projected onto the first conductive layer, an unnecessary charge which has been stored on the electrostatic recording member can be removed, whereby problems of an afterimage or deterioration in the S/N ratio due to the unnecessary charge can be overcome.

Since the electrostatic latent image read-out apparatus of the present invention is for reading out an electrostatic latent image on the aforesaid electrostatic recording member, it can project the read-out electromagnetic wave from the read-out photoconductive layer side which is relatively thin when reading out the electrostatic latent image recorded on the electrostatic recording member. Accordingly, the electrostatic latent image can be read out at a high speed under a strong electric field. Further since there hardly remains a charge on the electrostatic recording member after read-out, another latent image can be recorded on the electrostatic recording member without an erasing process. Accordingly the electrostatic latent image read-out apparatus of the present invention need not be provided with an exposure means for the erasing process and may be simple in structure. As the read-out exposure means, those which emit a laser beam can be employed, and in the case of the electrostatic recording member provided with a comb electrode for read-out, the read-out exposure means may be a line source. That is, the read-out exposure means need not be special or need not be provided with a special light source.

When the read-out exposure means projects the read-out electromagnetic wave like a pulse onto each pixel, a large detecting current can be obtained when reading out the electrostatic latent image, whereby the S/N ratio can be improved.

Specifically, operational amplifiers may be used, integrating capacitors may be used to detect stored charges pixel by pixel, and a bias voltage may be applied. In any case, the electrostatic latent image can be read out with a very simple arrangement.

BRIEF DESCRIPTION OF THE DRAWINGS

FIGS. 12A to 12C are views for illustrating the method of recording an electrostatic latent image on the electrostatic recording member of the fifth embodiment, FIG. 14 is a view showing a modification of the electrostatic recording member of the fifth embodiment, FIGS. 16A to 16D are views for illustrating the electric field distribution in the electrostatic recording member of the sixth embodiment, FIGS. 17A to 17E are views for illustrating the operation of an example of an electrostatic latent image read-out apparatus for reading out an electrostatic latent image from an electrostatic recording member of the present invention.

DESCRIPTION OF THE PREFERRED EMBODIMENTS

Figure 1:
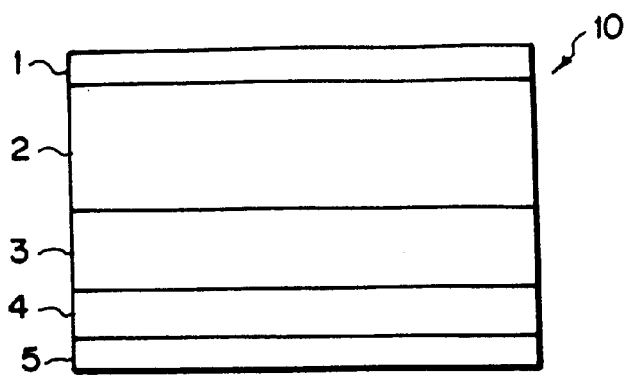
FIG. 1 is a cross-sectional view of an electrostatic recording member in accordance with a first embodiment of the present invention.

In FIG. 1, an electrostatic recording member 10 in accordance with a first aspect of the present invention comprises a first conductive layer 1 which transmits recording radiation L1 such as X-rays (will be referred to as "the recording light L1", hereinbelow), a recording photoconductive layer 2 which exhibits conductivity upon exposure to the recording light L1 passing through the first conductive layer 1, a charge transport layer 3 which substantially acts as an insulator to a charge in the same polarity as a charge placed on the first conductive layer 1 (latent image charge: e.g., a negative charge) and substantially acts as a conductive body to a charge (transfer charge: e.g., a positive charge) in the polarity reverse to the latent image charge, a read-out photoconductive layer 4 which exhibits conductivity upon exposure to a read-out electromagnetic wave L2 (will be referred to as "the read-out light" hereinbelow), and a second conductive layer 5 which transmits the read-out light L2. These layers are superposed one on another in this order.

Each of the conductive layers 1 and 5 may comprise, for instance, a glass plate provided with a uniform coating of a conductive material (nesa film or the like). The recording photoconductive layer 2 may comprise, for instance, a photoconductive material which contains as a major component at least one of a—Se, lead oxides (II) such as PbO, $PbI_2$, and the like, iodine oxides (II), $Bi_{12}(Ge,Si)O_{20}$, and $Bi_2I_3$/organic polymer nanocomposites.

Preferably the charge transport layer 3 is as large as possible in the difference between the mobility in the layer of the latent image charge placed on the first conductive layer 1 (e.g., a negative charge) and that of the transfer charge reverse to the latent image charge (e.g., not smaller than $10^2$, preferably not smaller than $10^3$). For instance, the charge transport layer 3 may comprise an organic compound such as poly-N-vinylcarbazole (PVK), N,N'-diphenyl-NN'-bis(3-methylphenyl)-[1,1'-biphenyl]-4,4'-diamine (TPD) and discotic liquid crystal, dispersion of TPD in polymer (polycarbonate, polystyrene, PUK), and a semiconductor material such as a—Se doped with 10 to 200 ppm of Cl. Among those, organic compounds (PVK, TPD, discomatic liquid crystal) are advantageous in that they are insensitive to light and in they are generally low in dielectric constant, which results in reduction in the capacity of the charge transport layer 3 and the read-out photoconductive layer 4 and increase in the signal taking efficiency upon read-out. The expression "insensitive to light" means that the material hardly exhibits conductivity upon exposure to the recording light L1 and/or the read-out light L2.

The read-out photoconductive layer 4 is preferably of a photoconductive material containing as a major component at least one of a—Se, Se—Te, Se—As—Te, nonmetal phthalocyanine and metallophthalocyanine such as MgPc (magnesium phthalocyanine), VoPc (phase II of vanadyl phthalocyanine) and CuPc (copper phthalocyanine).

In order to absorb a sufficient amount of the recording light L1, the recording photoconductive layer 2 is preferably not smaller than 50 $\mu$m and not larger than 1000 $\mu$m in thickness. In this particular embodiment, the recording photoconductive layer 2 is about 500 $\mu$m in thickness. The sum of the thickness of the read-out photoconductive layer 4 and that of the charge transport layer 3 is preferably not larger than 1/2 of the thickness of the recording photoconductive layer 2 and as the sum becomes smaller (not larger than 1/10, 1/20), the response upon read-out (to be described later) is improved.

The method of recording image information as an electrostatic latent image on the electrostatic recording member 10 and reading out the recorded electrostatic latent image will be described, hereinbelow.

Figure 2:
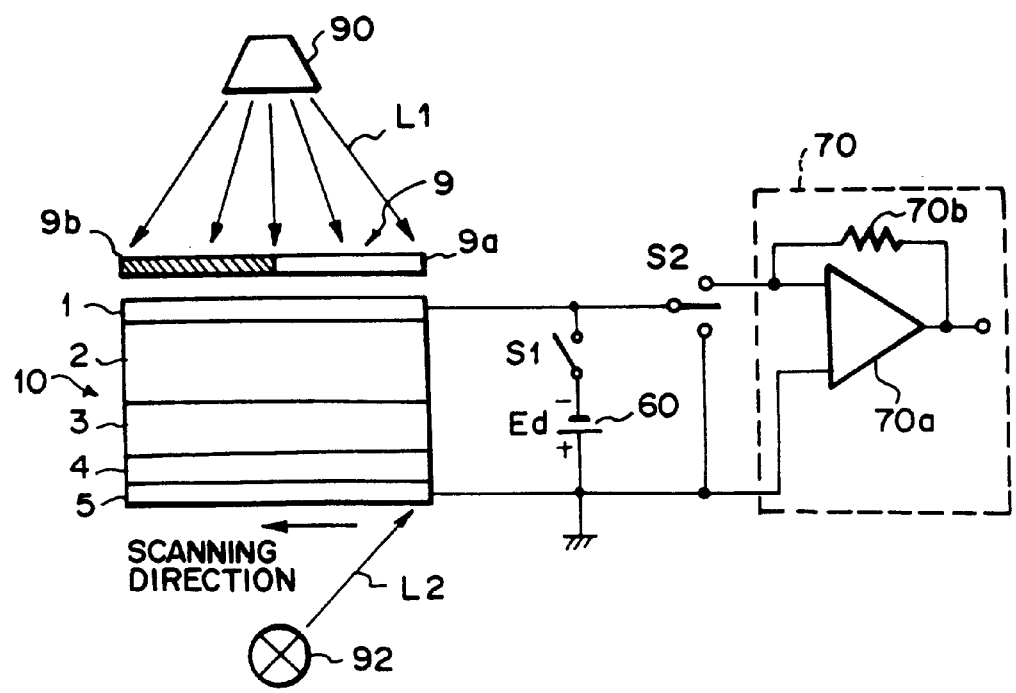
FIG. 2 is a schematic view showing an electrostatic latent image recording and read-out apparatus using the electrostatic recording member.

FIG. 2 is a schematic view showing an electrostatic latent image recording and read-out apparatus using the electrostatic recording member 10. The apparatus comprises an electrostatic recording member 10, a recording light projecting means 90, a power source 60, an electric current detecting means 70, a read-out exposure means 92, an on-off switch S1 and a change-over switch S2. The recording section is formed by the electrostatic recording member 10, the power source 60, the recording light projecting means 90 and the on-off switch S1, and the read-out section is formed by the electrostatic recording member 10, the current detecting means 70, the read-out exposure means 92 and the change-over switch S2.

The first conductive layer 1 of the electrostatic recording member 10 is connected to the negative pole of the power source 60 by way of the on-off switch S1 and to the movable contact of the change-over switch S2. The change-over switch S2 has a pair of fixed contacts, one connected to the current detecting means 70 and the other grounded. The second conductive layer 5 of the electrostatic recording member 10 and the positive pole of the power source 60 are also grounded. The current detecting means 70 comprises an operational amplifier (detecting amplifier) 70a and a feedback resistor 70b which form a so-called current/voltage conversion circuit.

An object 9 having a part 9a transparent to the recording light L1 and a part 9b nontransparent to the recording light L1 is placed on the upper surface of the first conductive layer 1 and is uniformly exposed to the recording light L1 by the recording light projecting means 90. The read-out exposure means 92 causes the read-out light L2 such as an infrared laser beam to scan the electrostatic recording member 10 in the direction of the arrow in FIG. 2. It is preferred that the read-out light L2 scans the electrostatic recording member 10 in the form of a beam spot of a small diameter.

Figure 3A:
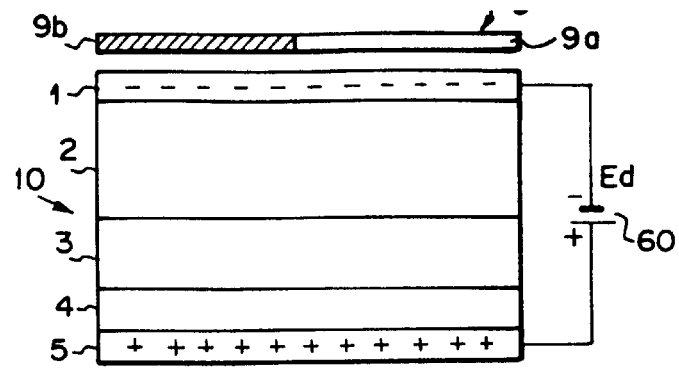
FIGS. 3A to 3D are views for illustrating the method of recording an electrostatic latent image on the electrostatic recording member.

The procedure of recording an electrostatic latent image and reading out the electrostatic latent image in the apparatus will be described, hereinbelow. First the procedure of recording an electrostatic latent image will be described with reference to the charge model shown in FIGS. 3A to 3D. With the change-over switch S2 in its neutral position (where the movable contact is connected to neither of the ground and the current detecting means 70), the on-off switch S1 is closed to apply a DC voltage of the power source 60 between the first conductive layer 1 and the second conductive layer 5, thereby placing a negative charge on the first conductive layer 1 and a positive charge on the second conductive layer 5 as shown in FIG. 3A. Thus a parallel electric field is established between the first and second conductive layers 1 and 5.

Figure 3B:
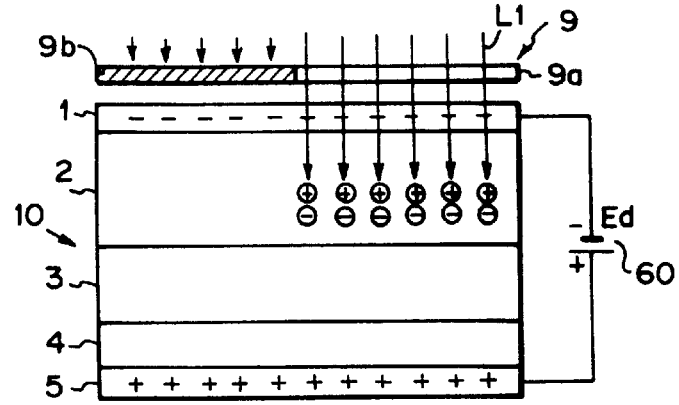

Then the recording light L1 is uniformly projected onto the object 9 from the recording light projecting means 90. The recording light L1 passes through the transparent portion 9a of the object 9 and the first conductive layer 1 and impinges upon the recording photoconductive layer 2. The recording photoconductive layer 2 becomes conductive upon exposure to the recording light L1. Specifically the resistance of the recording photoconductive layer 2 changes according to the amount of the recording light L1 impinging thereupon due to formation of charged pairs, electrons (negative ⊖) and holes (positive ⊕), as shown in FIG. 3B. As the amount of the recording light L1 impinging upon the recording photoconductive layer 2 increases, the resistance of the photoconductive layer 2 becomes smaller.

The positive charges generated in the recording photoconductive layer 2 travel through the photoconductive layer 2 toward the first conductive layer 1 at a high speed and encounter the negative charges on the first conductive layer 1 at the interface of the first conductive layer 1 and the recording photoconductive layer 2 to be nullified. (See FIGS. 3C and 3D) On the other hand, the negative charges generated in the recording photoconductive layer 2 travel through the photoconductive layer 2 toward the charge transport layer 3. Since the charge transport layer 3 acts as an insulating body to the charge which is the same in polarity as the charge placed on the first conductive layer 1 (negative charge in this particular embodiment) as described above, the negative charges travelling toward the charge transport layer 3 are stopped at the interface of the recording photoconductive layer 2 and the charge transport layer 3 and stored there. (See FIGS. 3C and 3D) The amount of the stored charges is determined by the amount of negative charges generated in the recording photoconductive layer 2, i.e., the amount of the recording light L1 passing through the object 9.

Figure 3C:
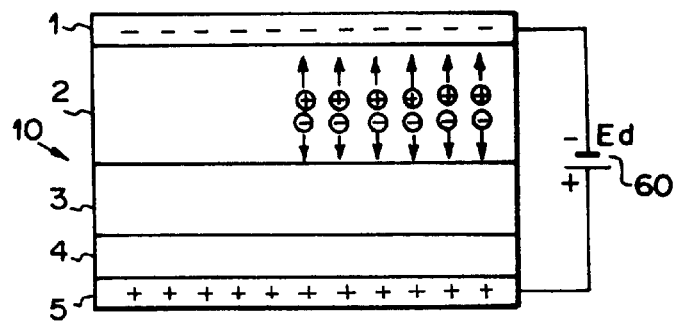
Figure 3D:
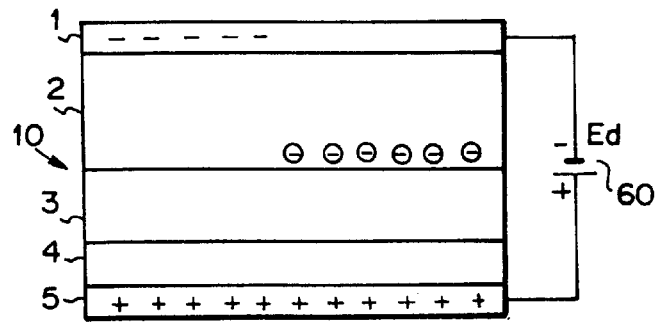

The portion of the electrostatic recording member just below the nontransparent portion 9b of the object 9, through which the recording light L1 cannot pass, is kept unchanged as can be seen from FIGS. 3B to 3D.

Thus by exposing the object 9 to the recording light L1, charges are stored on the interface of the recording photoconductive layer 2 and the charge transport layer 3 in a pattern corresponding to the image of the object 9. As can be understood from the description above, the electrostatic latent image recording system for recording to a electrostatic latent image on the electrostatic recording member 10 of the first embodiment can be very simple in structure and the recording operation is very simple.

Now the procedure of reading out an electrostatic latent image will be described with reference to the charge model shown in FIGS. 4A to 4D. The on-off switch S1 is first opened to cut power supply to the electrostatic recording member 10. Then the movable contact of the charge-over switch S2 is connected to the ground to electrify the first and second conductive layers 1 and 5 of the electrostatic recording member 10 at the same potential, thereby rearranging the charges. (See FIG. 4A) Thereafter the movable contact of the charge-over switch S2 is switched to the current detecting means 70.

Figure 4A:
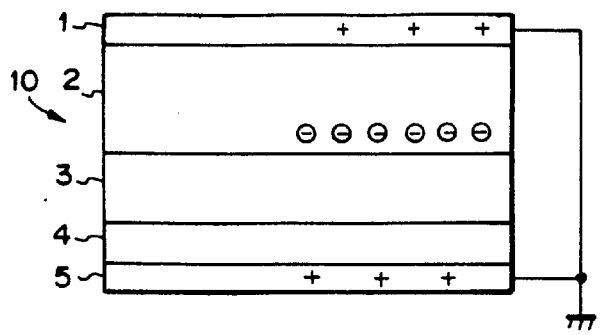
FIGS. 4A to 4D are views for illustrating the method of reading out an electrostatic latent image from the electrostatic recording member.
Figure 4B:
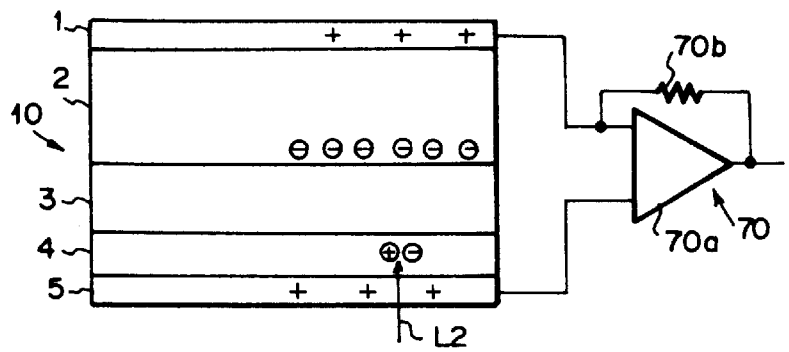
Figure 4C:
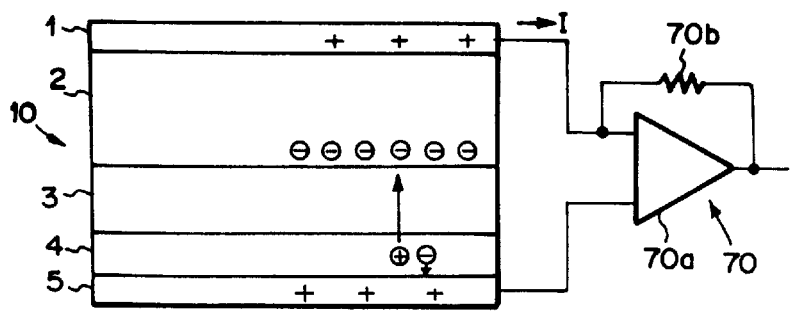
Figure 4D:
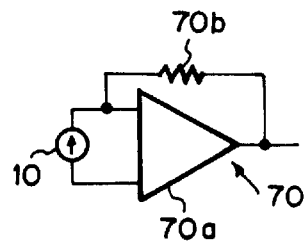

Then the read-out light L2 is caused to scan the second conductive layer 5 by the read-out exposure means 92. The read-out light L2 passes through the second conductive layer 5 and impinges upon the read-out photoconductive layer 4. The read-out photoconductive layer 4 becomes conductive upon exposure to the read-out light L2. This is due to formation of charged pairs, electrons (negative ⊖) and holes (positive ⊕), as shown in FIG. 4B.

The smaller the sum of the thicknesses of the read-out photoconductive layer 4 and the charge transport layer 3, the better. A very strong electric field is established by the stored charges (negative charges) between the second conductive layer 5 and the interface of the read-out photoconductive layer 4 and the charge transport layer 3, and the strength of the electric field increases as the sum of the thicknesses of the read-out photoconductive layer 4 and the charge transport layer 3 becomes smaller. Since the charge transport layer 3 acts as a conductive body to a positive charge, the positive charges generated in the read-out photoconductive layer 4 travel at a high speed through the charge transport layer 3 attracted by the stored charges and encounter the stored charges at the interface of the recording photoconductive layer 2 and the charge transport layer 3 to be nullified. (See FIG. 4C) On the other hand, the negative charges generated in the read-out photoconductive layer 4 encounter the positive charges on the second conductive layer 5 and are nullified. (See FIG. 4C) The read-out photoconductive layer 4 is exposed to a sufficient amount of the read-out light L2 and accordingly all the stored charges on the interface of the recording photoconductive layer 2 and the charge transport layer 3, that is, the electrostatic latent image, are nullified. This means that an electric current I flows through the electrostatic recording member 10 by movement of the charges. This can be represented by an equivalent circuit shown in FIG. 4D.

As described above, as the sum of the thicknesses of the read-out photoconductive layer 4 and the charge transport layer 3 becomes smaller, a stronger electric field is established and the charges move at a higher speed, whereby read-out can be effected at a higher speed. Further when the mobility in the charge transport layer 3 of the negative charges is sufficiently smaller than the positive charges (e.g., not larger than $1/10^3$), the charges can be more surely stored and retainability of the electrostatic latent image can be improved.

Figure 5:
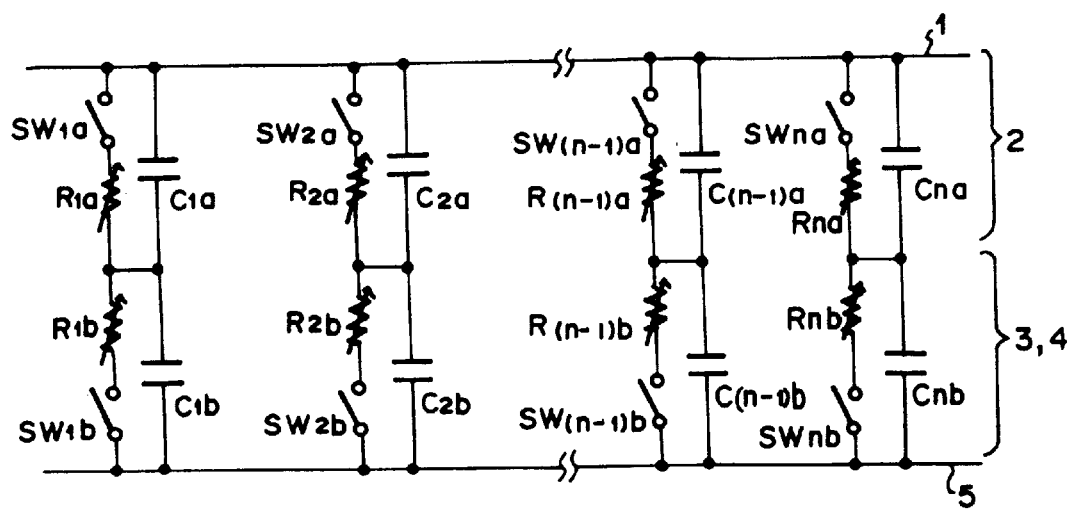
FIG. 5 is a view showing a circuit equivalent to the electrostatic recording member (a capacitor model)
Figure 6:
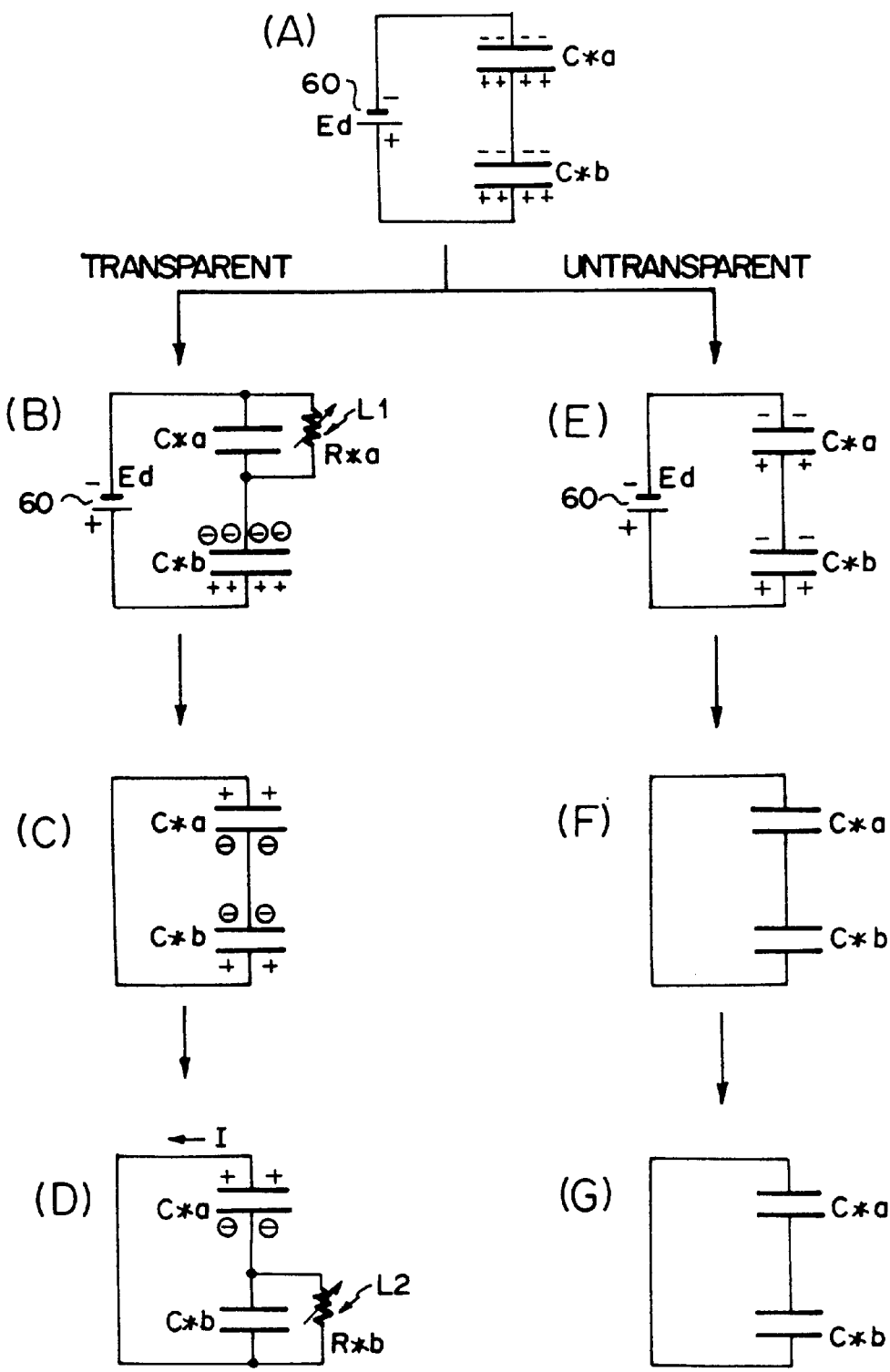
FIG. 6 is a view representing the method of reading out an electrostatic latent image from the electrostatic recording member on the basis of the capacitor model shown in FIG. 5.

The procedure of recording and reading out the electrostatic latent image described above will be briefly described with reference to the capacitor model shown in FIG. 5. In FIG. 5, $C_{*a}$ (* stands for 1, 2 . . . , n and basically represents a pixel) represents a distributed capacity in the recording photoconductive layer 2, $C_{*b}$ (* stands for 1, 2 . . . , n and basically represents a pixel) represents a distributed capacity in the charge transport layer 3 and the read-out photoconductive layer 4, $SW_{*a}$ (* stands for 1, 2 . . . , n and basically represents a pixel) represents a photo-switch in the recording photoconductive layer 2, $SW_{*b}$ (* stands for 1, 2 . . . , n and basically represents a pixel) represents a photo-switch in the charge transport layer 3 and the read-out photoconductive layer 4, $R_{*a}$ (* stands for 1, 2 . . . , n and basically represents a pixel) represents a variable resistor in the recording photoconductive layer 2 depending upon the amount of light, and $R_{*b}$ (* stands for 1, 2, . . . , n and basically represents a pixel) represents a variable resistor in the charge transport layer 3 and the read-out photoconductive layer 4 depending upon the amount of light. FIG. 6 is a view for illustrating the procedure of recording and reading out the electrostatic latent image on the basis of the capacitor model shown in FIG. 5 separately for the transparent portion 9a and the nontransparent portion 9b of the object 9. In the recording process, the distributed capacities $C_{*a}$ and $C_{*b}$ are charged in response to application a DC voltage Ed to the electrostatic recording member 10. (See FIG. 6-A)

In the portion corresponding to the transparent portion 9a, the photo-switches $SW_{*a}$ are closed in response to exposure to the recording light L1 and the resistances of the variable resistors $R_{*a}$ vary according to the amount of the recording light L1 passing through the first conductive layer 1, whereby only the distributed capacities $C_{*b}$ are held charged. (See FIG. 6-B) This is the electrostatic latent image recording process and the electrostatic latent image is recorded on the distributed capacities $C_{*b}$. Thereafter the power source 60 is disconnected and the distributed capacities $C_{*b}$ are connected to the distributed capacities $C_{*b'}$, thereby equalizing the potentials of the distributed capacities $C_{*a}$ and $C_{*b}$. (FIG. 6-C) Then when the read-out photoconductive layer 4 is exposed to the read-out light L2, the photo-switches $SW_{*b}$ are closed and the resistances of the variable resistors $R_{*b}$ vary according to the amount of the read-out light L2 passing through the second conductive layer 5, whereby an electric current I flows from the distributed capacities $C_{*a}$, i.e., the electrostatic latent image is read out. (FIG. 6-D)

On the other hand, in the portion corresponding to the nontransparent portion 9b, the photo-switches $SW_{*a}$ are not closed by the recording light L1 and the distributed capacities $C_{*a}$ and $C_{*b}$ are kept unchanged. (FIG. 6-E) Accordingly when the distributed capacities $C_{*a}$ and $C_{*b}$ are connected upon read-out, both the distributed capacities $C_{*a}$ and $C_{*b}$ are discharged. (FIG. 6-F) Accordingly even if the read-out photoconductive layer 4 is exposed to the read-out light L2, no electric current flows from the distributed capacities $C_{*a}$. (FIG. 6-G)

By thus detecting the electric current flowing from the electrostatic recording member 10 while scanning the read-out photoconductive layer 4 with the read-out light L2, the stored charges on the respective portions of the interfaces (corresponding to the pixels) can be read out in sequence, whereby the electrostatic latent image is read out. Since a very strong electric field is established between the second conductive layer 5 and the interface of the charge transport layer 3 and the recording photoconductive layer 2, the stored charges can be nullified at a very high speed, which results in a very high response in reading out the electrostatic latent image.

Generally when reading out an electrostatic latent image, a dark current also flows in proportion to the amount of all the stored charges in addition to the signal current which flows when the stored charges are nullified. Accordingly the signal current is detected riding over the dark current. The dark current forms noise in the electrostatic latent image read out. In this embodiment, the amount of the stored charges is proportional to the intensity of the recording light L1 passing through the object 9. Accordingly when the recording light L1 passing through the object 9 is weak, the amount of stored charges is small and the amount of the dark current is small, whereby the electrostatic latent image read out is high in quality. Further since there hardly remains a charge on the electrostatic recording member 10 after the electrostatic latent image is thus read out, another latent image can be recorded on the electrostatic recording member 10 without an erasing process.

The electrostatic recording member 10 of this embodiment may be formed of any suitable materials without limited to those described above.

For example, when as the charge transport layer 3, a layer in which the mobility of charge in the direction of thickness of the layer is larger than that in a direction parallel to the layer is employed, the charge is apt to move at a high speed in the direction of thickness of the layer and is not apt to move in the horizontal direction, whereby the sharpness can be improved. Preferred materials for forming such a charge transport layer include, for instance, discotic liquid crystals, hexapentyloxytriphenylene (See Physical Review LETTERS 70.4, 1933), and discotic liquid crystals whose core has a π-conjugation condensed ring or transition metal (See EKISHO, Vol No. 1, 1997, P55).

When the charge transport layer 3 includes at least a first charge transport layer formed of a material which substantially acts as an insulator to a charge in the same polarity as a charge placed on the first conductive layer 2 (the latent image charge) and a second charge transport layer formed of a material which substantially acts as a conductive body to a charge in the polarity reverse to the latent image charge (the transfer charge) with the first and second charge transport layers superposed so that the first charge transport layer faces toward the recording photoconductive layer 2 and the second charge transport layer faces toward the read-out photoconductive layer 4, the second charge transport layer contributes to transferring the transfer charge at a high speed and the first charge transport layer acts as a strong insulator to the latent image charge, whereby the charge transport layer can be optimal. Specifically it is preferred that the first charge transport layer be a layer consisting of at least one of PVK and TPD and the second charge transport layer be an a—Se layer doped with C1 of 10 to 200 ppm. In this case, it is preferred that the second charge transport layer is larger in thickness than the first charge transport layer.

As compared with a layer of TPD, a layer of PVK is stronger in the insulating force to a negative charge (the latent image charge in this embodiment). On the other hand, a layer of TPD is higher in the conductivity to a positive charge (the transfer charge in this embodiment) than a layer of PVK. Accordingly the first and second charge transport layers may be a layer of PVK and a layer of TPD, respectively.

The charge transport layer may 3 comprise three or more layers. In this case, the layers should be arranged in the order of insulating force to the latent image charge and the conductivity to the transfer charge so that the insulating force to the latent image charge becomes stronger toward the recording photoconductive layer 2 and the conductivity to the transfer charge becomes higher toward the read-out photoconductive layer 4.

When the read-out photoconductive layer 4 is a layer which exhibits a high sensitivity to an electromagnetic wave in a wavelength range of a near ultraviolet region to a blue region (300 to 550 nm) and a low sensitivity to an electromagnetic wave in a red region (not shorter than 700 nm), the band gap is large and generation of a dark current due to heat can suppressed, whereby noise due to a dark current can be reduced when the read-out light L2 is in a wavelength range of a near ultraviolet region to a blue region. Specifically such a read-out photoconductive layer 4 can be formed of a material containing as a major component at least one of a—Se, $PbI_2$, $Bi_{12}(Ge,Si)O_{20}$, perylene-bis-imide (R=n-propyl), and perylene-bis-imide (R=n-neopentyl).

An electrostatic recording member in accordance with a second embodiment of the present invention will be described with reference to FIGS. 7 and 8 (8A to 8C), hereinbelow. In FIG. 8, elements analogous to those shown in FIG. 1 will be given the same numerals and will not be described here.

The electrostatic recording member 11 of this embodiment differs from that of the first embodiment in that the read-out photoconductive layer 4a is formed of a material which also exhibits conductivity upon exposure to the recording light L1, e.g., a—Se, Se—Te, Se—As and Se—As—Te.

A method of recording an electrostatic latent image on the electrostatic recording member 11 of this embodiment using the recording and read-out apparatus shown in FIG. 2 will be described, hereinbelow. Though the operation of the apparatus is the same as in the electrostatic recording member 10 of the first embodiment, the amount of the charges stored on the interface of the recording photoconductive layer 2 and the charge transport layer 3 when a large amount of recording light L1 is impinges upon the recording photoconductive layer 2 differs from that in the first embodiment. This point will be described in detail, hereinbelow.

Figure 7:
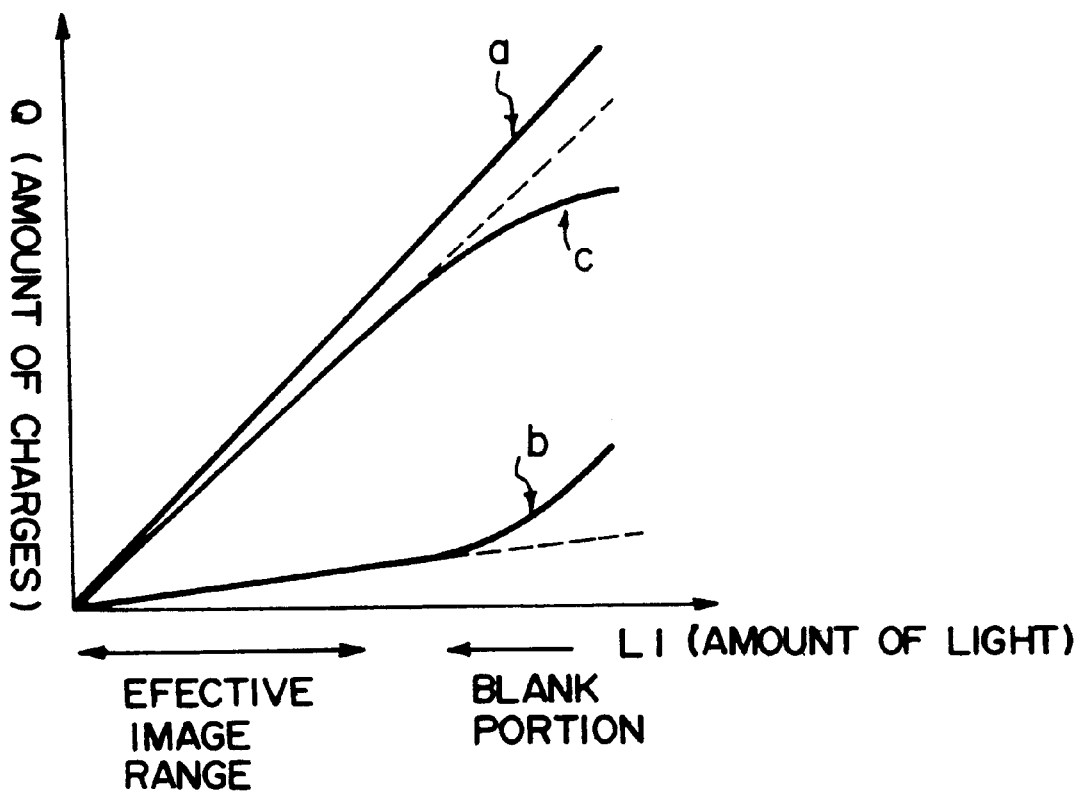
FIG. 7 is a view showing the relation between the amount of recording light passing through the object and the amount of stored charge.

The amount charges generated in the recording photoconductive layer 2 is substantially proportional to the amount of the recording light L1 which impinges upon the photoconductive layer 2 as shown by line a in FIG. 7.

Figure 8A:
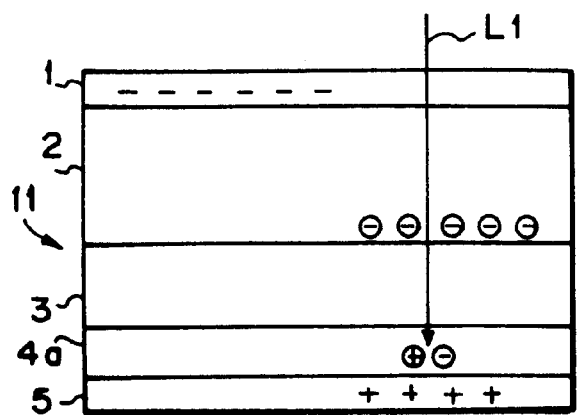
FIGS. 8A to 8C are views for illustrating the method of recording an electrostatic latent image on an electrostatic recording member in accordance with a second embodiment of the present invention.
Figure 8B:
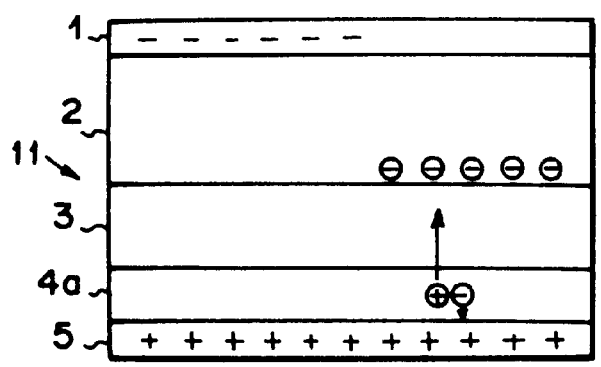

When the amount of the recording light L1 impinging upon the recording photoconductive layer 2 is sufficiently large, a part of the recording light L1 also impinges upon the read-out photoconductive layer 4a after passing through the recording photoconductive layer 2 and the charge transport layer 3. Since the read-out photoconductive layer 4a of the electrostatic recording member 11 of this embodiment also exhibits conductivity upon exposure to the recording light L1, charged pairs are generated in the read-out photoconductive layer 4a as shown in FIG. 8A by the part of the recording light L1 passing through the recording photoconductive layer 2 and the charge transport layer 3.

Figure 8C:
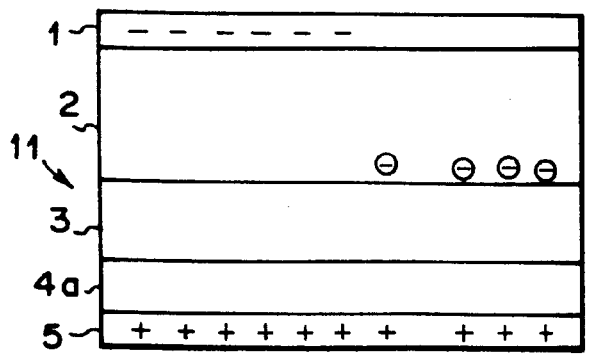

An electric field has been established in the charge transport layer 3 by the charges on the second conductive layer 5 and the charges stored on the interface of the recording conductive layer 2 and the charge transport layer 3. Since the charge transport layer 3 is conductive to a positive charge, the positive charges generated in the read-out photoconductive layer 4a are attracted toward the interface (FIG. 8B) and encounter the negative charges on the interface, whereby the positive and negative charges are nullified (FIG. 8C). This phenomenon occurs even if the amount of recording light L1 impinging upon the recording photoconductive layer 2 is small. However since the amount of charges generated in the read-out photoconductive layer 4a is proportional to the amount of the recording light L1, i.e., proportional to the amount of the stored charge, the amount of the stored charges still increase with an increase in the amount of the recording light L1.

However when the amount of the recording light L1 which reaches the read-out photoconductive layer 4a exceeds a certain value, the amount of the charged pairs generated in the read-out photoconductive layer 4a is sharply increased as shown by line b in FIG. 7 by an effect like a so-called avalanche effect. Accordingly in the case of the electrostatic recording member 11 of this embodiment, the amount of the charges stored on the interface is sharply reduced in the range of the amount of the recording light L1 larger than the certain value as shown by line c in FIG. 7. In contrast, in the case of the electrostatic recording member 10 of the first embodiment where the read-out photoconductive layer 4 is insensitive to the recording light L1, the amount of the stored charges is kept increased substantially proportional to the amount of the recording light L1 in the same manner as the amount charges generated in the recording photoconductive layer 2 shown by line a in FIG. 7.

In order to record an electrostatic latent image which faithfully reflects an image of an object, it is generally sufficient if the amount of the stored charges linearly changes with the amount of the recording light L1 impinging upon the recording photoconductive layer 2 in a predetermined range of the amount of the recording light L1 (an effective image range). Where the recording light L1 impinge, in an amount larger than the upper limit of the predetermined range, corresponds to a blank portion of the object and does not carry important image information. In such a portion, the amount of the stored charges need not be proportional to the amount of the recording light L1 but it is more important that the charges are not stored in an excessive amount since an excessive amount of the stored charges increases a dark current which deteriorates the S/N ratio of the image read out.

Thus in the electrostatic recording member 11 of this embodiment, the stored charges are prevented from being stored in an excessive amount and deterioration in the S/N ratio of the image read out due to the dark current can be prevented. The electrostatic recording member 11 of this embodiment can be easily applied to the recording and read-out apparatus shown in FIG. 2 by simply replacing the electrostatic recording member 10 of the first embodiment with the electrostatic recording member 11 of this embodiment.

Figure 9:
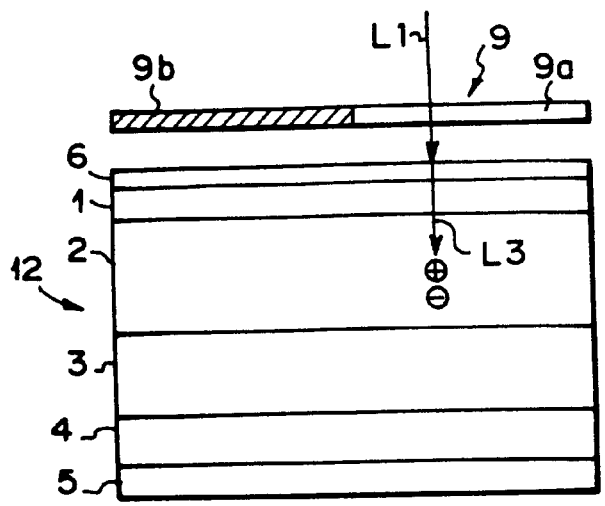
FIG. 9 is a view for illustrating the method of recording an electrostatic latent image on an electrostatic recording member in accordance with a third embodiment of the present invention.

An electrostatic recording member in accordance with a third embodiment of the present invention will be described with reference to FIG. 9, hereinbelow. In FIG. 9, the elements analogous to those shown in FIG. 1 are given the same reference numerals and will not be described here.

The electrostatic recording member 12 of this embodiment differs from that of the first embodiment in that a wavelength conversion layer 6 is formed over the first conductive layer 1. The wavelength conversion layer 6 is for converting the recording light L1 which is generally X-rays to visible light. In this particular embodiment, the wavelength conversion layer 6 is an X-ray scintillator which converts the recording light L1 to blue light L3. Such an X-ray scintillator can be formed of caesium iodide (CsI).

The first conductive layer 1 is transparent to the blue light L3 and the recording photoconductive layer 2 exhibits conductivity upon exposure to the blue light L3. These layers may be the same as those employed in the first and second embodiments. Since the electrostatic recording member 12 of this embodiment is for recording an electrostatic latent image upon exposure to the blue light L3, the first conductive layer 1 need not be transparent to X-rays and the recording photoconductive layer 2 need not be sensitive to X-rays.

The method of recording an electrostatic latent image on the electrostatic recording member 12 of this embodiment using the recording and read-out apparatus shown in FIG. 2 will be described, hereinbelow.

The recording light L1 impinges upon the wavelength conversion layer 6 after passing through the object 9. It is preferred that the wavelength conversion layer 6 is as high as possible in efficiency of converting the recording light L1 to the blue light L3. A layer of CsI is excellent in the wavelength conversion efficiency. The blue light L3 passes through the first conductive layer 1 and impinges upon the recording photoconductive layer 2. A recording photoconductive layer 2 of amorphous selenium exhibits conductivity at a very high efficiency upon exposure to the blue light L3. Accordingly, substantially the whole blue light L3 contributes to generation of charged pairs in the recording photoconductive layer 2 and a sufficient amount of charges can be stored even if the amount of the recording light L1 is reduced, whereby the dosage to the object can be reduced.

When a layer which converts the recording light L1 to light L4 in a different wavelength range such as a red region in addition to light L3 in the blue region (e.g., a layer formed of a scintillator which is a mixture of phosphors such as $Y_2O_3$:Eu and $TVO_4$:Eu emitting red light and phosphors such as CsI emitting blue light) is employed as the wavelength conversion layer 6 and a layer which is also sensitive to the red light L4 and exhibits conductivity upon exposure to the red light L4 (e.g., one formed of nonmetal phthalocyanine or metallophthalocyanine) is employed as the read-out photoconductive layer 4, a part of the red light L4 passes through the recording photoconductive layer 2 and the charge transport layer 3 and impinges upon the read-out photoconductive layer 4 since the recording photoconductive layer 2 of amorphous selenium is insensitive to the red light L4. The read-out photoconductive layer 4 becomes conductive upon exposure to the red light L4. Accordingly, the stored charges are prevented from being stored in an excessive amount in the same manner as described above in the second embodiment and deterioration in the S/N ratio of the image read out due to the dark current can be prevented.

Figure 10A:
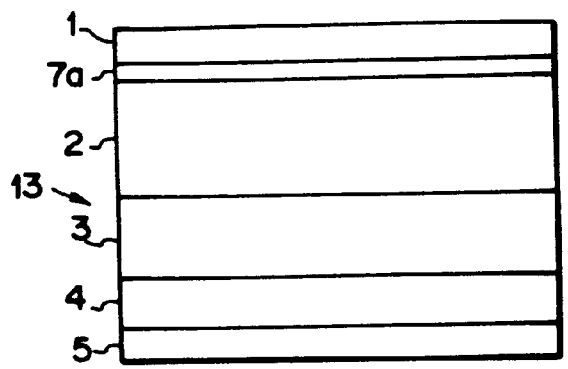
FIG. 10A is a cross-sectional view of an electrostatic recording member in accordance with a fourth embodiment of the present invention.
Figure 10B:
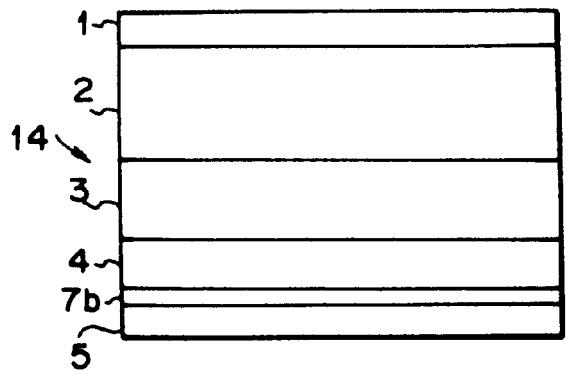
FIG. 10B is a cross-sectional view of a modification of the electrostatic recording member of the fourth embodiment.

An electrostatic recording member in accordance with a fourth embodiment of the present invention will be described with reference to FIG. 10, hereinbelow. In FIG. 10A, the elements analogous to those shown in FIG. 1 are given the same reference numerals and will not be described here.

As shown in FIG. 10A, the electrostatic recording member 13 of this embodiment differs from the electrostatic recording member 10 of the first embodiment in that a blocking layer 7a is interposed between the first conductive layer 1 and the recording photoconductive layer 2. The blocking layer 7a is a barrier layer which is of $Al_2O_3$ or the like about 500 Å thick and has a barrier potential. A part of the negative charges placed on the first conductive layer 1 can be directly injected into the recording photoconductive layer 2 and can be stored on the interface of the recording photoconductive layer 2 and the charge transport layer 3. This stored charge component is not derived from exposure to the recording light L1 and accordingly, forms noise. The blocking layer 7a prevents the charges (negative in this particular embodiment) from being injected into the recording photoconductive layer 2, thereby preventing the generation of noise.

Similarly a part of the charges placed on the second conductive layer 5 (positive in this particular embodiment) can be directly injected into the read-out photoconductive layer 4 and can travel through the charge transport layer 3 to encounter the stored charges on the interface of the recording photoconductive layer 2 and the charge transport layer 3. When the positive encounters the stored negative charges, a part of the stored negative charges are nullified. This nullification is not derived from exposure to the read-out light L2 and accordingly, forms noise. For the purpose of preventing the positive charges from being directly injected into the read-out photoconductive layer 4, a blocking layer 7b is interposed between the second conductive layer 5 and the read-out photoconductive layer 4 in an electrostatic recording member 14 shown in FIG. 10B.

Figure 11:
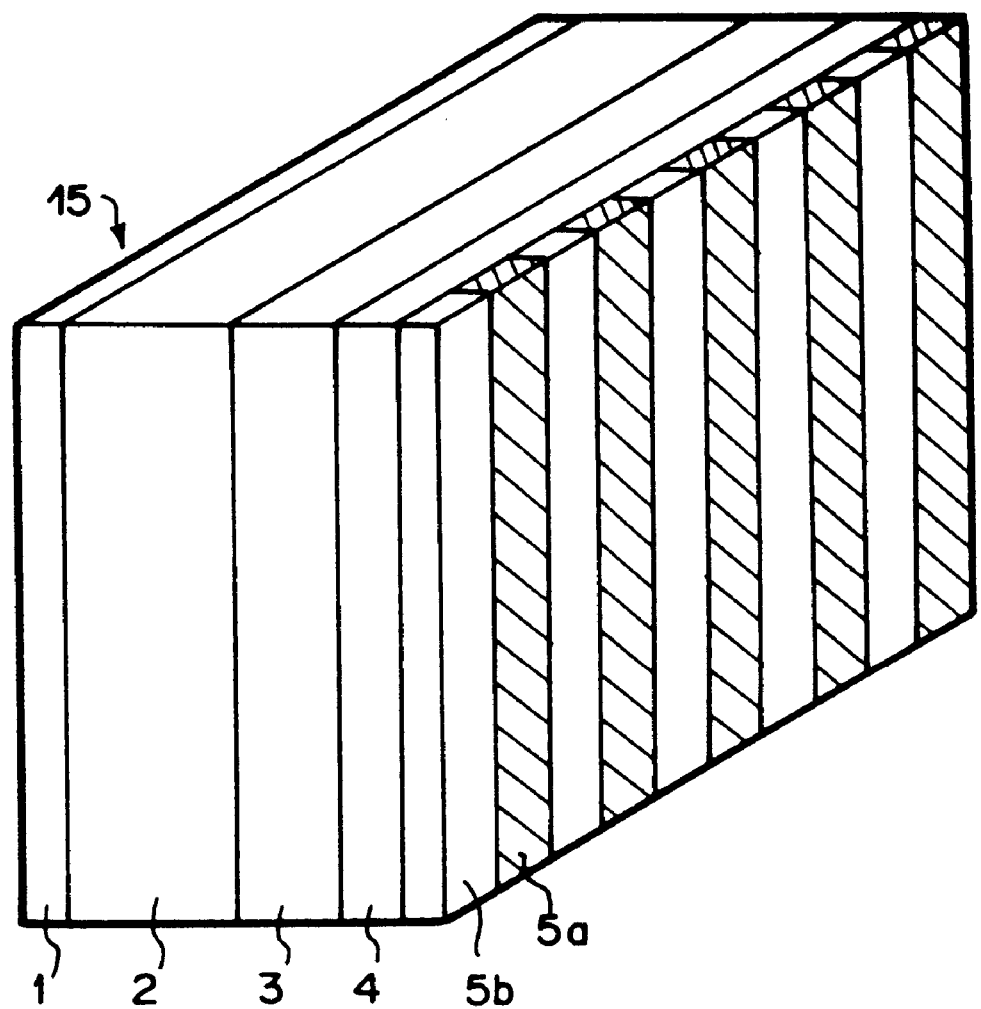
FIG. 11 is a perspective view of an electrostatic recording member in accordance with a fifth embodiment of the present invention.

An electrostatic recording member in accordance with a fifth embodiment of the present invention will be described with reference to FIG. 11, hereinbelow. In FIG. 11, the elements analogous to those shown in FIG. 1 are given the same reference numerals and will not be described here.

As shown in FIG. 11, an electrostatic recording member 15 of this embodiment differs from the electrostatic recording member 10 of the first embodiment in that the second conductive layer 5 is in the form of comb teeth 5a. The interspaces 5b between the teeth 5a are filled with a material which is nontransparent to the read-out light L2.

Though an electrostatic latent image can be recorded on the electrostatic recording member 15 of this embodiment by use of the recording and read-out apparatus shown in FIG. 2, charges are stored on the interface between the recording photoconductive layer 2 and the charge transport layer 3 in a manner different from that in the electrostatic recording member 10 of the first embodiment. This will be described with reference to FIGS. 12A to 12C, hereinbelow. When recording an electrostatic latent image, a DC voltage is first applied between the first conductive layer 1 and the comb teeth 5a of the second conductive layer 5, thereby electrifying the conductive layers 1 and 5. This establishes a U-shaped electric field between the first conductive layer 1 and each comb tooth 5a. Accordingly a substantially parallel electric field exists in the major part of the recording photoconductive layer 2. However there are formed portions Z which are free from an electric field on the interface of the recording photoconductive layer 2 and the charge transport layer 3 between the comb teeth 5a as shown in FIG. 12A. Such electric field-free portions Z are formed more clearly as the sum of the thicknesses of the charge transport layer 3 and the read-out photoconductive layer 4 becomes smaller as compared with the thickness of the recording photoconductive layer 2 and as the ratio of the width of each comb tooth 5a to the pitch of the teeth 5a becomes smaller (preferably not larger than 75%). Further when the sum of the thicknesses of the charge transport layer 3 and the read-out photoconductive layer 4 is substantially the same as the pitch of comb teeth or smaller than the same, the electric field-free portions Z are formed more clearly.

When the object 9 is exposed to the recording light L1, the negative charges of the charged pairs generated in the recording photoconductive layer 2 by the recording light L1 passing through the transparent part 9a of the object 9 are concentrated on the comb teeth 5a along the electric fields as shown in FIG. 12B, whereby an electrostatic latent image is formed as a pattern of charges concentrated on the comb teeth 5a as shown in FIG. 12C. The positive charges of the charged pairs generated in the recording photoconductive layer 2 are attracted to the first conductive layer 1 and nullified as in the first embodiment.

Especially when the amount of the recording light L1 is small, the negative charges are concentrated on the center of each comb teeth 5a and stored on the interface in groups spaced from each other. The spaces between the groups of charges correspond to the pitch of the comb teeth 5a and accordingly as the pitch of the comb teeth becomes smaller, the sharpness (space resolution) of the recorded electrostatic latent image increases. It is easy to form the comb teeth 5a at a sufficiently small pitch by use of a semiconductor forming technique.

Figure 13A:
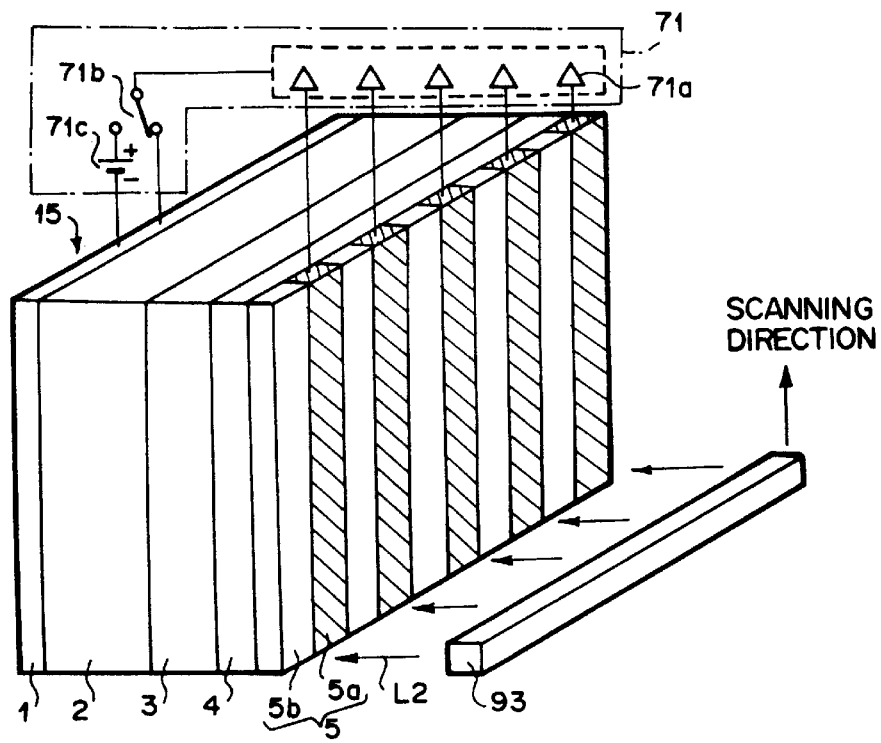
FIG. 13A is a schematic view showing an electrostatic latent image recording and read-out apparatus for reading out the electrostatic latent image from the electrostatic recording member of the fifth embodiment.
Figure 13B:
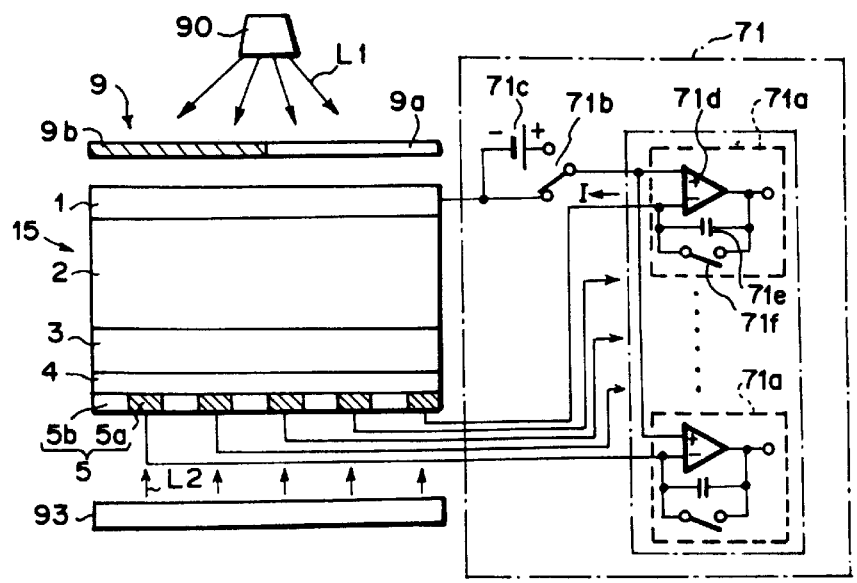
FIG. 13B is a block diagram of the electrostatic latent image recording and read-out apparatus.

The procedure of recording an electrostatic latent image on the electrostatic recording member 15 of this embodiment and reading out the electrostatic latent image will be described with reference to the recording and read-out apparatus shown in FIGS. 13A and 13B. As shown in FIGS. 13A and 13B, the recording and read-out apparatus comprises an electrostatic recording member 15, a current detecting means 71, a recording light projecting means 90 and a read-out exposure means 93. The read-out exposure means 93 is a line exposure means which causes a line image of a read-out light L2, which is substantially uniform in intensity and extends substantially in perpendicular to the comb teeth 5a, to scan the second conductive layer 5 in the longitudinal direction of the comb teeth 5a. When the electrostatic recording member 15 in which the second conductive layer 5 is in the form of a comb electrode is employed, the second conductive layer 5 may be scanned with a line image of the read-out light L2 instead of a beam spot and accordingly the scanning optical system may be very simple in structure and can be manufactured at low cost. Further since an incoherent light source can be employed, generation of noise due to interference fringes can be prevented. Of course, the second conductive layer 5 may be scanned with a beam spot.

The current detecting means 71 comprises a plurality of current detecting amplifiers 71a connected to the comb teeth 5a and detects the electric current flowing through the comb teeth 5a tooth by tooth in parallel. The first conductive layer 1 of the electrostatic recording member 15 is connected to one fixed contact of a change-over switch 71b and the negative pole of a power source 71c. The positive pole of the power source 71c is connected to the other fixed contact of the change-over switch 71b as shown in FIG. 13B.

An electrostatic latent image is recorded on the electrostatic recording member 15 in the same manner as in the first embodiment. At this time, the movable contact of the change-over switch 71b is connected to the positive pole of the power source 71c. Thereafter the movable contact of the change-over switch 71b is connected to the first conductive layer 1. When the read-out photoconductive layer 4 is scanned with the read-out light L2, an electric current I flows to each comb tooth 5a from the first conductive layer 1 through the detecting amplifier 71a. In the detecting amplifier 71a, an integrating capacitor 71e is charged by the electric current I and charges are stored in the integrating capacitor 71e according to the amount of the current I, whereby the voltage across the integrating capacitor 71e is increased. Accordingly, by closing an on-off switch 71f to discharge the stored charges and then opening the on-off switch 71f during intervals between pixels, the voltage across the integrating capacitor 71e varies from pixel to pixel according to the stored charges for each pixel. Thus by detecting the change in the voltage across the integrating capacitor 71e, the electrostatic latent image can be read out.

In this embodiment, since the second conductive layer 5 is in form of a comb electrode, the distributed capacities between the charge transport layer 3 and the read-out photoconductive layer 4 are small and the current detecting means is less apt to be affected by noise. Further the pixel pitch can be fixed to the pitch of the teeth 5a and image data on the electrostatic latent image read out can be corrected depending on the arrangement of the teeth 5a, whereby structure noise can be accurately corrected.

Since the teeth 5a and the stored charges attract each other, the positive charges generated in the read-out photoconductive layer 4 upon exposure to the read-out light L2 are more apt to migrate to the interface of the recording photoconductive layer 2 and the charge transport layer 3 to nullify the stored charges, whereby the sharpness can be kept high also upon read-out. This effect is significant where there is less charge, that is, portions exposed to less recording light L1. Further since the strength of the electric field is increased near the teeth 5a and charged pairs are generated under the strong electric field, the efficiency of ionic dissociation of excitons is increased and quantum efficiency in generation of the charged pairs can be close to 1, whereby the light energy density may be reduced. Further the capacity of the charge transport layer 3 and the read-out photoconductive layer 4 can be reduced and the signal taking efficiency upon read-out can be increased.

As shown in FIG. 14, it is possible to make portions (hatched portions) of each tooth 5a nontransparent to the read-out light L2 so that transparent portions and nontransparent portions are alternately arranged in the longitudinal direction of the tooth 5a (the scanning direction) as well as making nontransparent the interspaces between the teeth 5a. In this case, the transparent portions are arranged in a grid pattern and pixels adjacent to each other in the longitudinal direction can also be clearly separated, whereby deterioration in space resolution due to interference between the adjacent pixels can be avoided. With this arrangement, scanning the second conductive layer 5 with a line image of the read-out light L2 results in scanning the read-out photoconductive layer 4 with a plurality of fine beam spots at one time. Accordingly a very high sharpness can be obtained without highly converging the read-out light L2.

Figure 15A:
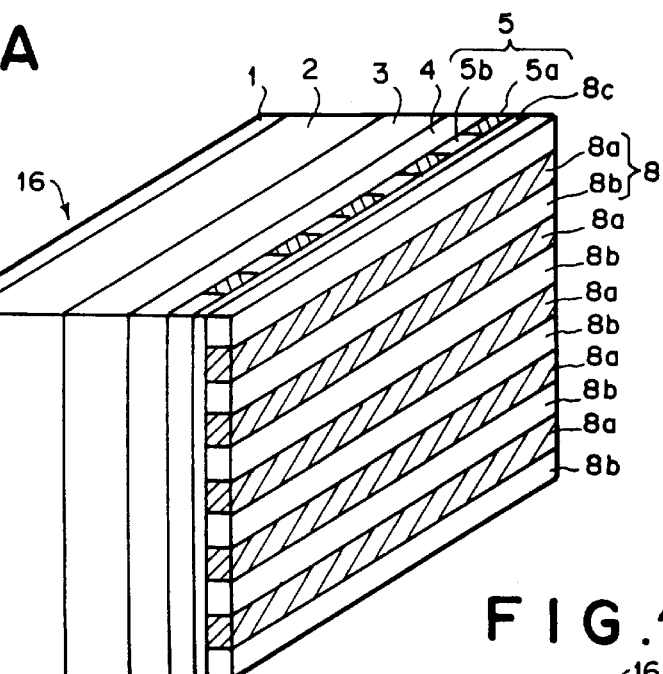
FIG. 15A is a perspective view of an electrostatic recording member in accordance with a sixth embodiment of the present invention.
Figure 15B:
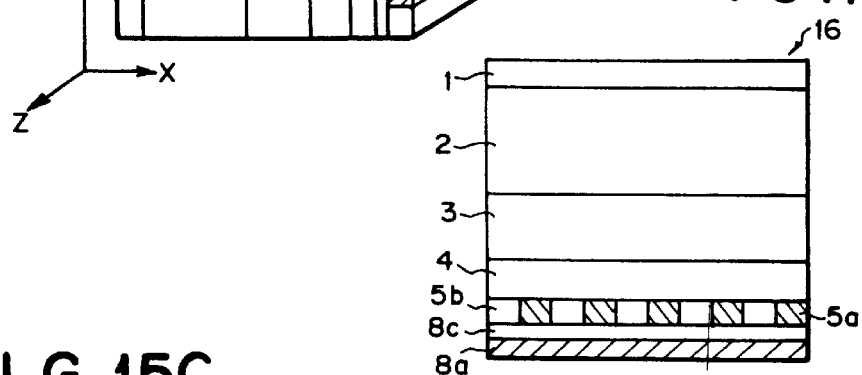
FIG. 15B is a cross-section view of the electrostatic recording member of the sixth embodiment taken along a plane parallel to X-Z plane.
Figure 15C:
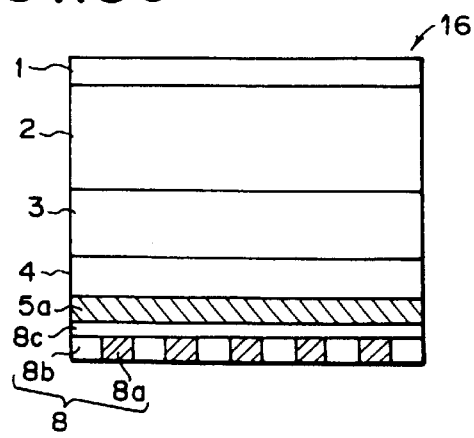
FIG. 15C is a cross-section view of the electrostatic recording member of the sixth embodiment taken along a plane parallel to X-Y plane.

An electrostatic recording member in accordance with a sixth embodiment of the present invention will be described with reference to FIGS. 15A to 15C, hereinbelow. In FIGS. 15A to 15C, the elements analogous to those shown in FIG. 11 are given the same reference numerals and will not be described here.

As shown in FIGS. 15A to 15C, an electrostatic recording member 16 of this embodiment differs from the electrostatic recording member 15 of the fifth embodiment in that an insulating layer 8c and a third conductive layer 8 provided with a comb teeth conductive portions 8a, both the layers being transparent to the read-out light L2, are superposed on the second conductive layer 5 in this order. The comb teeth 8a are substantially in perpendicular to the comb teeth 5a on the second conductive layer 5.

The method of recording an electrostatic latent image on the electrostatic recording member 16 of this embodiment will be described with reference to FIGS. 16A to 16D, hereinbelow.

When recording an electrostatic latent image, a DC voltage is applied between the first conductive layer 1 and comb teeth 8a of the third conductive layer 8, thereby electrifying the first conductive layer 1 and comb teeth 8a. At this time, it is preferred than no voltage be applied to the comb teeth 5a of the second conductive layer 5. Electric fields distributed as shown in FIGS. 16B and 16C are formed between the second and third conductive layers 5 and 8. That is, electric fields which are converged from the teeth 8a of the third conductive layer 8 toward the teeth 5a of the second conductive layer 5 and are U-shaped as seen in the longitudinal direction of the teeth 5a are formed as shown in FIG. 16B. At the same time, electric fields which diverges from the teeth 8a of the third conductive layer 8 toward the teeth 5a of the second conductive layer 5 and are U-shaped as seen in the longitudinal direction of the teeth 8a are formed as shown in FIG. 16C. Between the first and second conductive layers 1 and 5, the electric fields are distributed in the same manner as in the fifth embodiment. As a result, a contour line-like electric field is established about each intersection of the teeth 5a of the second conductive layer 5 and the teeth 8a of the third conductive layer 8 as shown in FIG. 16D, where the teeth 5a and 8a are depicted overlapped with each other.

When the object 9 is exposed to the recording light L1 in this state, the stored charges are concentrated on the intersections of the teeth 5a and 8a, whereby an electrostatic latent image can be recorded at a higher sharpness than in the electrostatic recording member 15 of the fifth embodiment. When the ratio of the width of the tooth 8a to the pitch of the teeth is small (e.g., not larger than 75%), the sharpness can be further increased. This effect is further increased by forming the interspaces 8b of the teeth 8a of a material which is nontransparent to the read-out light L2, e.g., a high polymer (e.g., polyethylene) dispersed with a small amount of pigment such as carbon black.

The electrostatic latent image thus recorded can be read out by detecting the electric current flowing between the first conductive layer 1 and the teeth 5a in the same manner as in the fifth embodiment. At this time, it is preferred that the teeth 8a of the third conductive layer 8 be left as it is. Further the pixels can be fixed in the longitudinal directions of the teeth 5a and 8a and structure noise can be more accurately corrected on the basis of the arrangement of the teeth 5a and 8a.

Another (a third) example of an electrostatic latent image read-out apparatus will be described, hereinbelow.

In the examples described above, the read-out exposure means 92 or 93 is assumed to emit steady light. This example differs from the preceding examples in that the read-out exposure means emits the read-out light L2 in a pulse-like fashion. The operation of the read-out apparatus of this example will be described with reference to FIGS. 17A to 17E, hereinbelow.

Figure 17A:
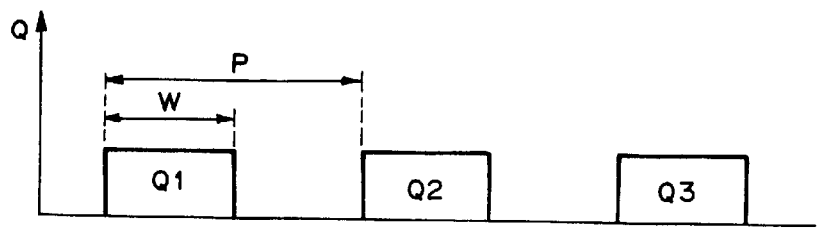
Figure 17B:
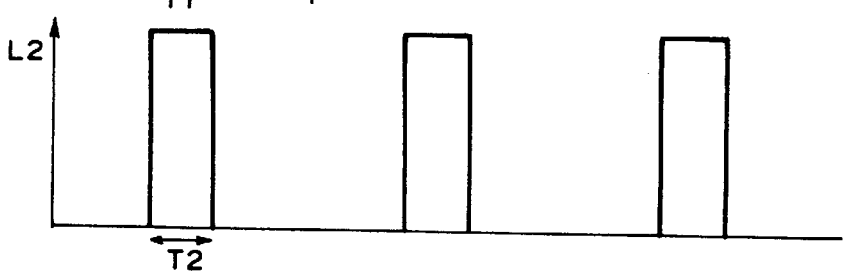

When reading out an electrostatic latent image from an electrostatic recording member (e.g., the electrostatic recording member 10 of the first embodiment), a dark current which is substantially proportional to the total amount of the charges on the pixels flows as described above, and the dark current keeps flowing uniformly irrespective of the pixels while the current is detected and makes a noise component. Accordingly assuming that the stored charges Q (Q1 to Q3) for the respective pixels (width W, pitch P) are as shown in FIG. 17A, the currents detected when the stored charges are read out with a reading time of T1 by use of steady read-out light L2 are represented as the sum of the signal current and the dark current proportional to the total amount of the charges as shown in FIG. 17B.

Figure 17D:
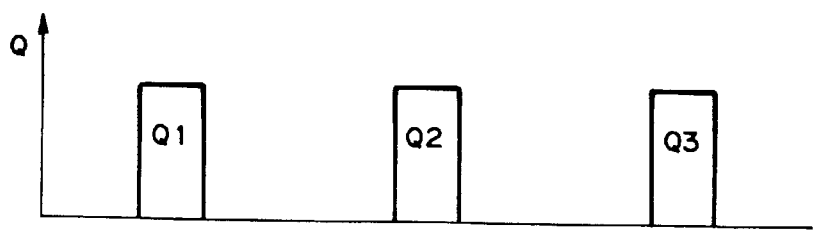
Figure 17E:
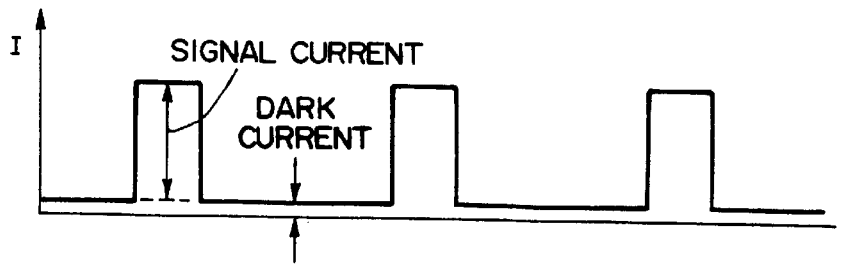

To the contrary, when the read-out exposure means emits read-out light L2 of sufficient intensity in a pulse-like fashion (T1>T2) as shown in FIG. 17C, the stored charges are read out only for duration of the pulse light as shown in FIG. 17D. Since the current is represented by a time differential of a charge, the shorter the reading time is, the larger the current is for a given amount of charge. Accordingly when the charges are read out with pulse light, a larger current can be detected as shown in FIG. 17E. By reading out the electrostatic latent image with the read-out light L2 emitted as short pulses, even a small amount of charges can be detected as sufficiently large currents, whereby the S/N ratio in the image read out can be greatly improved.

Figure 18:
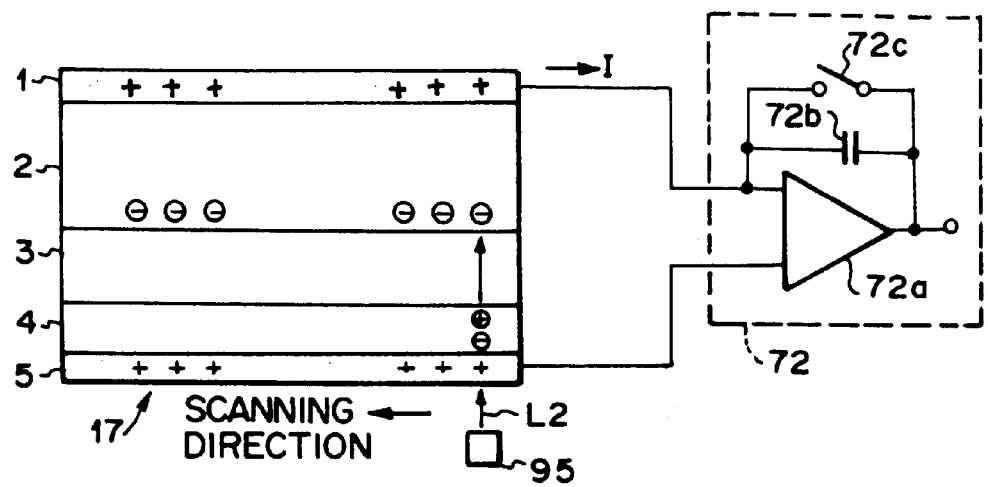
FIG. 18 is a schematic view showing another example of an electrostatic latent image read-out apparatus for reading out an electrostatic latent image from an electrostatic recording member of the present invention.

A fifth example of the electrostatic latent image read-out apparatus will be described with reference to FIG. 18, hereinbelow. In FIG. 18, the elements analogous to those shown in FIG. 2 are given the same reference numerals and will not be described here. This example differs from the example shown in FIG. 2 only in the arrangement of the current detecting means and the other part of the apparatus are not shown in FIG. 18. In FIG. 18, the electrostatic recording member 17 may be any one of the preceding embodiments and the read-out exposure means 95 may be any one of those described above.

In this example, the current detecting means 72 comprises a detecting amplifier (operational amplifier) 72a, an integrating capacitor 72b connected between the output and one input of the operational amplifier 72a, and an on-off switch 72c connected in parallel to the integrating capacitor 72b. Said one input of the operational amplifier 72a is connected to the first conductive layer 1 of the electrostatic recording member 17 and the other input is connected to the second conductive layer 5.

When reading out the electrostatic latent image from the electrostatic recording member 17, the on-off switch S1 (FIG. 2) is first opened to cut power supply to the electrostatic recording member 17. Then the movable contact of the charge-over switch S2 (FIG. 2) is connected to the ground to electrify the first and second conductive layers 1 and 5 of the electrostatic recording member 10 at the same potential. Thereafter the movable contact of the charge-over switch S2 is switched to the current detecting means 72. This state is shown in FIG. 18.

When the read-out photoconductive layer 4 is scanned with the read-out light L2 by the read-out exposure means 95, an electric current I flows from the first conductive layer 1 into the current detecting means 72. The integrating capacitor 72b is charged by the electric current I and charges are stored in the integrating capacitor 72b according to the amount of the current I, whereby the voltage across the integrating capacitor 72b is increased. Accordingly, by closing the on-off switch 72c to discharge the stored charges and then opening the on-off switch 72c during intervals between pixels, the voltage across the integrating capacitor 72b varies from pixel to pixel according to the stored charges for each pixel. Thus by detecting the change in the voltage across the integrating capacitor 72b, the electrostatic latent image can be read out.

The read-out apparatus of this example is equivalent in the effect to that shown in FIG. 2 and as simple in structure as that shown in FIG. 2.

Figure 19:
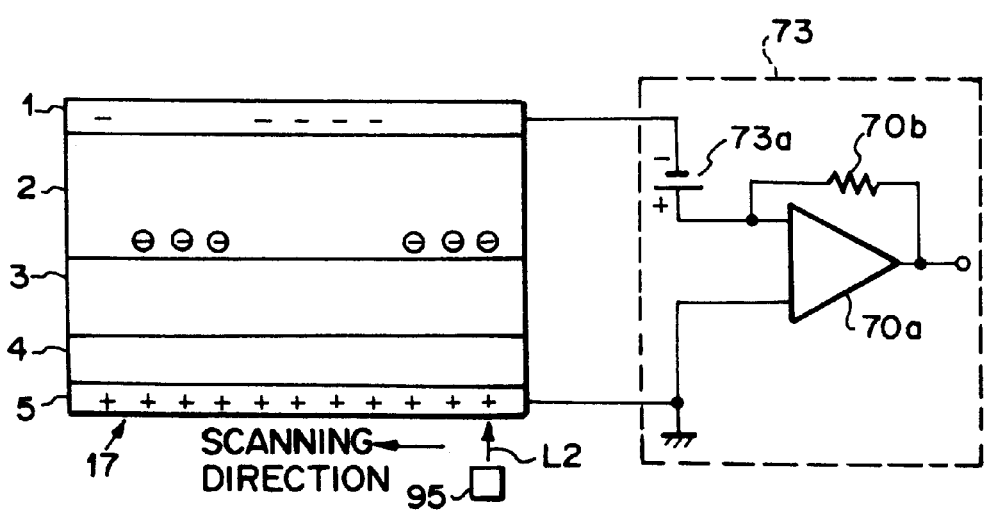
FIG. 19 is a schematic view showing still another example of an electrostatic latent image read-out apparatus for reading out an electrostatic latent image from an electrostatic recording member of the present invention.

A sixth example of the electrostatic latent image read-out apparatus will be described with reference to FIG. 19, hereinbelow. In FIG. 19, the elements analogous to those shown in FIG. 2 are given the same reference numerals and will not be described here. This example differs from the example shown in FIG. 2 only in that a bias power source 73a is inserted between the first conductive layer 1 and input of the current detecting means 73. In FIG. 19, the electrostatic recording member 17 may be any one of the preceding embodiments and the read-out exposure means 95 may be any one of those described above.

In this example, the electrostatic latent image us read out in the same manner as that shown in FIG. 2. However by applying a bias voltage, read-out can be effected at a higher speed and the electrostatic latent image can be surely erased. Accordingly, a problem that residual charges generates noise in the following latent image can be avoided.

The bias power source 73a may be provided separately from the DC power source 60 or the DC power source may double as the bias power source 73a to apply the bias voltage through a suitable switching means such as by changing connection of the switches S1 and S2.

Also the read-out apparatus of this example is equivalent in the effect to that shown in FIG. 2 and as simple in structure as that shown in FIG. 2.

A recording and read-out apparatus where pre-exposure is effected will be described, hereinbelow. First description will be made on the pre-exposure.

Though basically the recording and read-out apparatuses described above can entirely read out the stored charges, a part of the stored charges sometimes remains on the electrostatic recording member. Further when a high voltage is applied to the electrostatic recording member before exposing the electrostatic recording member to the recording light, a dark current is generated and charges generated by the dark current (dark current charges) are also stored on the electrostatic recording member. Further for the various reasons, various charges are stored on the electrostatic recording member before exposure to the recording light L1. These unnecessary charges are added to the charges bearing thereon the image information stored in response to exposure to the recording light L1 and causes an afterimage phenomenon and/or deterioration in the S/N ratio.

The pre-exposure is for erasing the unnecessary charges before recording an electrostatic latent image.

Figure 20:
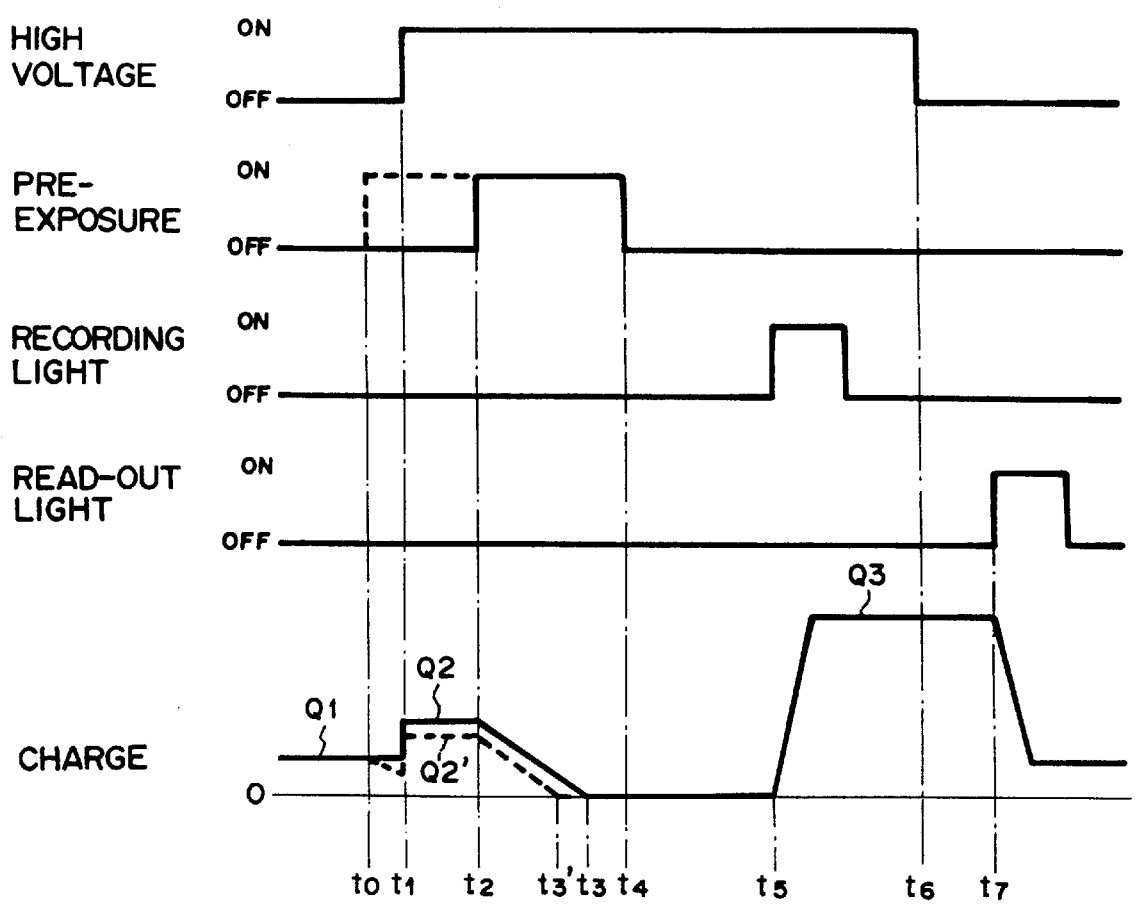
FIG. 20 is a timing chart showing the relation among the pre-exposure, exposure to the recording light, exposure to the read-out light, application of a high electric voltage and storage of charge on the electrostatic recording member.

FIG. 20 is a timing chart showing the relation among the pre-exposure, exposure to the recording light, exposure to the read-out light, application of a high electric voltage and storage of charge on the electrostatic recording member.

In FIG. 20, it is assumed that an unnecessary charge Q1 has been stored until time t0. When the pre-exposure is effected before application of the high voltage as shown by the dashed line, the charge Q1 can be reduced. When the high voltage is applied at time t1, a dark current charge is added to the charge which has been stored on the electrostatic recording member. Accordingly, when the pre-exposure is not effected before application of the high voltage, the stored charge amounts to Q2 and when the pre-exposure is effected before application of the high voltage, the stored charge amounts to Q2' smaller than Q2. When the pre-exposure is effected in a period from time t2 to t4, the charge Q2 is reduced. Of course the residual charge amounts to different values depending on the timing of the pre-exposure. For example, when the recording light L1 is projected at time t5 after the residual charge is nullified by effecting the pre-exposure from time t2 to time t4 as shown by the solid line in FIG. 20, a charge Q3 bearing thereon only image information can be stored on the electrostatic recording member. Accordingly, when exposing the read-out photoconductive layer to the read-out light L2 at time t7, signals can be taken out on the basis of the Q3 bearing thereon only image information, whereby an afterimage phenomenon and/or deterioration in the S/N ratio can be avoided.

Figure 21:
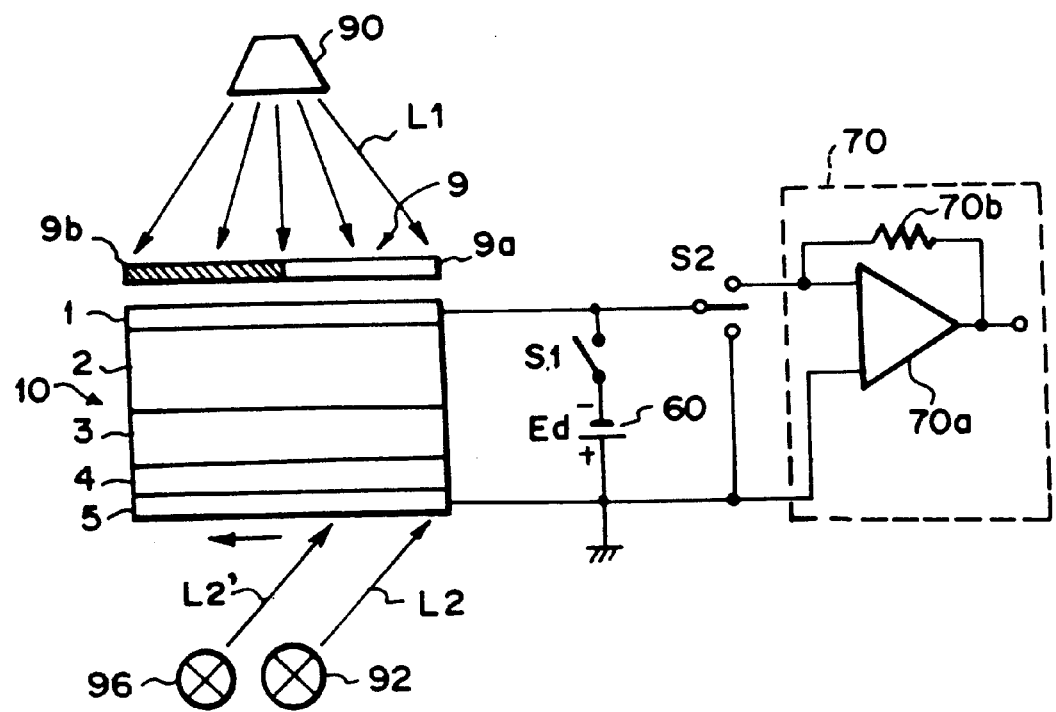
FIG. 21 is a schematic view showing a still another example of an electrostatic latent image read-out apparatus for reading out an electrostatic latent image from an electrostatic recording member of the present invention where the pre-exposure is carried out.

A recording and read-out apparatus where pre-exposure is effected will be described with reference to FIG. 21, hereinbelow. This apparatus differs from that shown in FIG. 2 only in that a pre-exposure means 96 is provided in addition to the elements shown in FIG. 2.

Predetermined light L2' is projected over the entire area of the second conductive layer 5 of the electrostatic recording member 10 before projecting recording light L1 after application of the high voltage, thereby eliminating the charge stored on the electrostatic recording member 10. The pre-exposure may be initiated before application of the high voltage (period from time t0 to t2 in FIG. 20. At this time, the movable contact of the change-over switch S2 is held in its neutral position (where the movable contact is connected to neither of the ground and the current detecting means 70), or in contact with the ground. When grounded, the movable contact should be moved to the neutral position before application of the high voltage. The light L2' may of the same electromagnetic wave as the read-out light L2 and may be smaller than the read-out light L2 in amount. Since the pre-exposure is for eliminating the unnecessary charges, the light L2' may be only a particular part of the second conductive layer 5 as required.

The read-out exposure means 92 may double as the pre-exposure means 96.

Further the pre-exposure means 96 may comprise an organic or inorganic electric luminescence or a combination of liquid crystal and a back light for the liquid crystal.

Though, in the description above, the first conductive layer 1 is electrified in a negative charge and the second or third conductive layer 5 or 8 is electrified in a positive charge, and negative charges are stored on the interface of the recording photoconductive layer 2 and the charge transport layer 3, the conductive layers may be electrified in the reverse charges so that positive charges are stored on the interface. In such case, the hole transfer layer is changed to an electron transfer layer, and the conductive layers are connected to the reverse poles of the power source upon recording.

For example, the recording photoconductive layer 2 may comprise a—Se, lead oxides (II), iodine oxides (II) as in the embodiments described above, the charge transport layer 3 may comprise, for instance, N-trinitrofluoreniden.aniline (TNFA) derivative, trinitrofluorenone (TNF)/polyester dispersion or nonsymmetrical diphenoquinone derivative, the read-out photoconductive layer 4 may comprise nonmetal phthalocyanine or metallophthalocyanine as in the embodiments described above, and the read-out photoconductive layer 4a may comprise a—Se, Se—Te, Se—As or Se—As—Te as in the embodiment described above.

In the above-described embodiments of the invention, the electrostatic recording member is exposed to the recording radiation from the first conductive layer side. It will be noted, however, that it may be exposed to the recording radiation from the second conductive layer side, when the second conductive layer, the read-out photoconductive layer and the charge transport layer transmit the recording radiation.

What is claimed is:

1. An electrostatic recording member on which radiation image information is recorded as an electrostatic latent image, comprising:
   a plurality of layers superposed one on another in a following order:
      a first conductive layer which transmits recording radiation,
      a recording photoconductive layer which exhibits conductivity upon exposure to said recording radiation,
      a charge transport layer which substantially acts as an insulator to a charge in a same polarity as a charge placed on the first conductive layer and substantially acts as a conductive body to a charge in a polarity reverse to said charge placed on the first conductive layer,
      a read-out photoconductive layer which exhibits conductivity upon exposure to a read-out electromagnetic wave, and
      a second conductive layer which transmits the read-out electromagnetic wave.

2. An electrostatic recording member as defined in claim 1 in which the recording photoconductive layer contains as a major component at least one of a—Se, PbO, $PbI_2$, $Bi_{12}(Ge,Si)O_{20}$, and $Bi_2I_3$/organic polymer nanocomposites.

3. An electrostatic recording member as defined in claim 2 in which the recording photoconductive layer is not smaller than 50 μm and not larger than 1000 μm in thickness.

4. An electrostatic recording member as defined in claim 1 in which the read-out photoconductive layer also exhibits conductivity upon exposure to the recording radiations.

5. An electrostatic recording member as defined in claim 4 in which the read-out photoconductive layer contains as a major component at least one of a—Se, Se—Te, and Se—As—Te.

6. An electrostatic recording member as defined in claim 1 in which the read-out photoconductive layer contains as a major component at least one of a—Se, Se—Te, Se—As—Te, nonmetal phthalocyanine and metallophthalocyanine.

7. An electrostatic recording member as defined in claim 6, wherein said metallophthalocyanine is one of MgPc, VoPc and CuPc.

8. An electrostatic recording member as defined in claim 1 in which the read-out photoconductive layer exhibits a high sensitivity to an electromagnetic wave in a wavelength range of a near ultraviolet region to a blue region and a low sensitivity to an electromagnetic wave in a red region.

9. An electrostatic recording member as defined in claim 8 in which the read-out photoconductive layer contains as a major component at least one of a—Se, $PbI_2$, $Bi_{12}(Ge, Si)O_{20}$, perylene-bis-imide (R=n-propyl), and perylene-bis-imide (R=n-neopentyl).

10. An electrostatic recording member as defined in claim 1 in which the charge transport layer contains as a major component at least one of PVK, TPD, dispersion of TPD in polymer, and a—Se doped with 10 to 200 ppm of Cl.

11. An electrostatic recording member as defined in claim 1 in which the charge transport layer is larger in a mobility of charge in a direction of thickness of the layer than in a direction parallel to the layer.

12. An electrostatic recording member as defined in claim 1 in which the charge transport layer includes at least a first charge transport layer formed of a material which substantially acts as an insulator to a charge in the same polarity as the charge placed on the first conductive layer and a second charge transport layer formed of a material which substantially acts as a conductive body to the charge in the polarity reverse to the charge placed on the first conductive layer with the first and second charge transport layers superposed so that the first charge transport layer faces toward the recording photoconductive layer and the second charge transport layer faces toward the read-out photoconductive layer.

13. An electrostatic recording member as defined in claim 12 in which the first charge transport layer is of an organic material and the second charge transport layer is of a Se series material.

14. An electrostatic recording member as defined in claim 13 in which the first charge transport layer is a layer consisting of at least one of PVK and TPD and the second charge transport layer is an a—Se layer doped with Cl of 10 to 200 ppm.

15. The apparatus as defined in claim 1, wherein said charge transport layer is a layer composed of an organic polymeric material.

16. The apparatus as defined in claim 15, wherein said organic polymeric material is PVK.

17. The apparatus as defined in claim 1, wherein said charge transport layer is a layer composed of an organic monomeric material.

18. The apparatus as defined in claim 17, wherein said organic monomeric material is TPD.

19. The apparatus as defined in claim 1, wherein said charge transport layer is a layer composed of dispersion of an organic monomeric material in a polymer.

20. The apparatus as defined in claim 19, wherein said organic monomeric material is TPD.

21. The apparatus as defined in claim 19, wherein said polymer contains at least one of polycarbonate, polystyrene and PVK.

22. The apparatus as defined in claim 1, wherein said charge transport layer comprises a first and second charge transport layer; wherein said second charge transport layer is an a—Se layer doped with Cl of 10 to 200 ppm; wherein said second charge transport layer is superposed on one surface of said first charge transport layer, which is closer to the read-out photoconductive layer; wherein said second charge transport layer is larger in thickness than said first charge transport layer; and wherein said transfer charges in said second charge transport layer are holes.

23. An apparatus as defined in claim 1, wherein said charge transport layer comprises a discotic liquid crystal material and mobility of charge in a direction of thickness of said charge transport layer is larger than mobility of charge in directions parallel to said charge transport layer.

24. An electrostatic recording member as defined in claim 1 in which a first blocking layer which prevents the charge placed on the first conductive layer from being injected into the recording photoconductive layer is interposed between the first conductive layer and the recording photoconductive layer.

25. An electrostatic recording member as defined in claim 1 or 24 in which a second blocking layer which prevents the charge placed on the second conductive layer from being injected into the read-out photoconductive layer is interposed between the second conductive layer and the read-out photoconductive layer.

26. An electrostatic recording member as defined in claim 1 in which a sum of a thickness of the read-out photoconductive layer and that of the charge transport layer is not larger than 1/2 of a thickness of the recording photoconductive layer.

27. An electrostatic recording member as defined in claim 26 in which a sum of a thickness of the read-out photoconductive layer and that of the charge transport layer is not larger than 1/10 of a thickness of the recording photoconductive layer.

28. An electrostatic recording member as defined in claim 27 in which a sum of a thickness of the read-out photoconductive layer and that of the charge transport layer is not larger than 1/20 of a thickness of the recording photoconductive layer.

29. An electrostatic recording member as defined in claim 1 in which a mobility in the charge transport layer of the charge in the same polarity as the charge placed on the first conductive layer is not larger than $1/10^2$ of a mobility in the charge transport layer of the charge in the polarity reverse to the charge placed on the first conductive layer.

30. An electrostatic recording member as defined in claim 29 in which a mobility in the charge transport layer of the charge in the same polarity as the charge placed on the first conductive layer is not larger than $1/10^3$ of a mobility in the charge transport layer of the charge in the polarity reverse to the charge placed on the first conductive layer.

31. An electrostatic recording member as defined in claim 1 in which the second conductive layer is in a form of comb teeth.

32. An electrostatic recording member as defined in claim 31 in which a width of each comb tooth of said comb teeth is not larger than 75% of a pitch of the teeth.

33. An electrostatic recording member as defined in claim 31 in which interspaces between the comb teeth are nontransparent to the read-out electromagnetic wave.

34. An electrostatic recording member as defined in claim 31 or 33 in which portions of each tooth which are between pixels arranged in a longitudinal direction of the tooth are nontransparent to the read-out electromagnetic wave.

35. An electrostatic recording member as defined in claim 31 in which a sum of a thickness of the read-out photoconductive layer and that of the charge transport layer is substantially a same as a pitch of the teeth or smaller.

36. An electrostatic recording member as defined in claim 31 in which an insulating layer and a third conductive layer both of which transmit the read-out electromagnetic wave are superposed on the second conductive layer in this order and the third conductive layer is in a form of comb teeth extending substantially in perpendicular to those of the second conductive layer.

37. An electrostatic recording member as defined in claim 36 in which interspaces between the comb teeth of the third conductive layer are nontransparent to the read-out electromagnetic wave.

38. An electrostatic recording member as defined in claim 36 in which a width of each comb tooth of said comb teeth is not larger than 75% of a pitch of the teeth.

39. An electrostatic recording member as defined in claim 36 in which a sum of a thickness of the read-out photoconductive layer and that of the charge transport layer is substantially a same as the pitch of a comb teeth of the third conductive layer or smaller.

40. An electrostatic latent image recording apparatus for recording radiation image information as an electrostatic latent image on an electrostatic recording member as defined in claim 1 or 31, comprising:
a power source which applies a predetermined DC voltage between the first and second conductive layers, and
a recording light projecting means which projects recording radiation bearing thereon the radiation image information onto the electrostatic recording member,
wherein the radiation image information is recorded as an electrostatic latent image by projecting the recording radiations onto the first conductive layer of the electrostatic recording member to cause the interface of the recording photoconductive layer and the charge transport layer of the electrostatic recording member to store a charge in the same polarity as the charge placed on the first conductive layer.

41. An electrostatic latent image recording apparatus as defined in claim 40 further comprising a pre-exposure means which projects a predetermined amount of electromagnetic radiation onto the second conductive layer before the recording radiation are projected onto the first conductive layer.

42. An electrostatic recording member on which radiation image information is recorded as an electrostatic latent image, comprising:
a plurality of layers superposed one on another in a following order:
a wavelength conversion layer which converts recording radiation to visible light in a first wavelength range,
a first conductive layer which transmits the visible light,
a recording photoconductive layer which exhibits conductivity upon exposure to the visible light passing through the first photoconductive layer,
a charge transport layer which substantially acts as an insulator to a charge in a same polarity as a charge placed on the first conductive layer and substantially acts as a conductive body to a charge in a polarity reverse to said charge placed on the first conductive layer,
a read-out photoconductive layer which exhibits conductivity upon exposure to a read-out electromagnetic wave, and
a second conductive layer which transmits the read-out electromagnetic wave.

43. An electrostatic recording member as defined in claim 42 in which the wavelength conversion layer converts the recording radiation also to visible light in a second wavelength range, and the read-out photoconductive layer exhibits conductivity also upon exposure to the visible light in the second wavelength range.

44. An electrostatic recording member as defined in claim 42 in which the read-out photoconductive layer contains as a major component at least one of a—Se, Se—Te, Se—As—Te, nonmetal phthalocyanine and metallophthalocyanine.

45. An electrostatic recording member as defined in claim 44, wherein said metallophthalocyanine is one of MgPc, VoPc and CuPc.

46. An electrostatic recording member as defined in claim 42 in which the read-out photoconductive layer exhibits a high sensitivity to an electromagnetic wave in a wavelength range of a near ultraviolet region to a blue region and a low sensitivity to an electromagnetic wave in a red region.

47. An electrostatic recording member as defined in claim 46 in which the read-out photoconductive layer contains as a major component at least one of a—Se, $PbI_2$, $Bi_{12}(Ge,Si)O_{20}$, perylene-bis-imide (R=n-propyl), and perylene-bis-imide (R=n-neopentyl).

48. An electrostatic recording member as defined in claim 42 in which the charge transport layer contains as a major component at least one of PVK, TPD, dispersion of TPD in polymer, and a—Se doped with 10 to 200 ppm of Cl.

49. An electrostatic recording member as defined in claim 42 in which the charge transport layer is larger in mobility of charge in direction of thickness of the layer than that in a direction parallel to the layer.

50. An electrostatic recording member as defined in claim 42 in which the charge transport layer includes at least a first charge transport layer formed of a material which substantially acts as an insulator to charge in the same polarity as charge placed on the first conductive layer and a second charge transport layer formed of a material which substantially acts as a conductive body to a charge in the polarity reverse to the charge placed on the first conductive layer with the first and second charge transport layers superposed so that the first charge transport layer faces toward the recording photoconductive layer and the second charge transport layer faces toward the read-out photoconductive layer.

51. An electrostatic recording member as defined in claim 50 in which the first charge transport layer is of an organic material and the second charge transport layer is of a Se series material.

52. An electrostatic recording member as defined in claim 51 in which the first charge transport layer is a layer consisting of at least one of PVK and TPD and the second charge transport layer is an a—Se layer doped with Cl of 10 to 200 ppm.

53. An electrostatic recording member as defined in claim 42 in which a first blocking layer which prevents the charge placed on the first conductive layer from being injected into the recording photoconductive layer is interposed between the first conductive layer and the recording photoconductive layer.

54. An electrostatic recording member as defined in claim 42 or 53 in which a second blocking layer which prevents the charge placed on the second conductive layer from being injected into the read-out photoconductive layer is interposed between the second conductive layer and the read-out photoconductive layer.

55. An electrostatic recording member as defined in claim 42 in which a sum of a thickness of the read-out photoconductive layer and that of the charge transport layer is not larger than 1/2 of a thickness of the recording photoconductive layer.

56. An electrostatic recording member as defined in claim 55 in which a sum of a thickness of the read-out photoconductive layer and that of the charge transport layer is not larger than 1/10 of a thickness of the recording photoconductive layer.

57. An electrostatic recording member as defined in claim 56 in which a sum of a thickness of the read-out photoconductive layer and that of the charge transport layer is not larger than 1/20 of a thickness of the recording photoconductive layer.

58. An electrostatic recording member as defined in claim 42 in which a mobility in the charge transport layer of the charge in the same polarity as the charge placed on the first conductive layer is not larger than $1/10^2$ of a mobility in the charge transport layer of the charge in the polarity reverse to the charge placed on the first conductive layer.

59. An electrostatic recording member as defined in claim 58 in which a mobility in the charge transport layer of the charge in the same polarity as the charge placed on the first conductive layer is not larger than $1/10^3$ of a mobility in the charge transport layer of the charge in the polarity reverse to the charge placed on the first conductive layer.

60. An electrostatic recording member as defined in claim 42 in which the second conductive layer is in a form of comb teeth.

61. An electrostatic recording member as defined in claim 60 in which a width of each comb tooth of said comb teeth is not larger then 75% of a pitch of the teeth.

62. An electrostatic recording member as defined in claim 60 in which the interspaces between the comb teeth are untransparent to the read-out electromagnetic wave.

63. An electrostatic recording member as defined in claim 60 or 62 in which portions of each tooth between pixels arranged in the longitudinal direction of the tooth are nontransparent to the read-out electromagnetic wave.

64. An electrostatic recording member as defined in claim 60 in which a sum of a thickness of the read-out photoconductive layer and that of the charge transport layer is substantially the same as the pitch of the teeth or smaller than the same.

65. An electrostatic recording member as defined in claim 60 in which an insulating layer and a third conductive layer both of which transmit the read-out electromagnetic wave are superposed on the second conductive layer in this order and the third conductive layer is in a form of comb teeth extending substantially in perpendicular to those of the second conductive layer.

66. An electrostatic recording member as defined in claim 65 in which interspaces between the comb teeth of the third conductive layer are nontransparent to the read-out electromagnetic wave.

67. An electrostatic recording member as defined in claim 65 in which a width of each comb tooth of said comb teeth is not larger than 75% of a pitch of the teeth.

68. An electrostatic recording member as defined in claim 65 in which a sum of a thickness of the read-out photoconductive layer and that of the charge transport layer is substantially a same as a pitch of the comb teeth of the third conductive layer or smaller.

69. An electrostatic latent image recording apparatus for recording radiation image information as an electrostatic latent image on an electrostatic recording member as defined in claim 36 or 65, comprising a power source which applies a predetermined DC voltage between the first and third conductive layers, and a recording light projecting means which projects recording radiation bearing thereon the radiation image information onto the first conductive layer, wherein the radiation image information is recorded as an electrostatic latent image by projecting the recording radiation onto the first conductive layer of the electrostatic recording member to cause an interface of the recording photoconductive layer and the charge transport layer of the electrostatic recording member to store a charge in the same polarity as the charge placed on the first conductive layer.

70. An electrostatic latent image recording apparatus as defined in claim 69 further comprising a pre-exposure means which projects a predetermined amount of electromagnetic radiation onto the second conductive layer before the recording radiation is projected onto the first conductive layer.

71. An electrostatic latent image read-out apparatus for reading out an electrostatic latent image from an electrostatic recording member defined claim 1 or 42, comprising:

a read-out exposure means which causes a read-out electromagnetic wave to scan the second conductive layer of the electrostatic recording member, and an electric current detecting means which detects through one of the first and second conductive layer an electric current flowing out of the electrostatic recording member according to the electrostatic latent image recorded thereon upon exposure to the read-out electromagnetic wave.

72. An electrostatic latent image read-out apparatus as defined in claim 71 further comprising a connecting means which connects the first conductive layer selectively to one of the second conductive layer and the current detecting means, wherein the connecting means first connects the first conductive layer to the second conductive layer to equalize a potential of the second conductive layer to that of the first conductive layer and then connects the first conductive layer to the current detecting means to detect the electric current flowing out of the electrostatic recording member.

73. An electrostatic latent image read-out apparatus as defined in claim 71 in which said electrostatic recording member is an electrostatic recording member in which the read-out photoconductive layer exhibits a high sensitivity to an electromagnetic wave in a wavelength range of a near ultraviolet region to a blue region and a low sensitivity to an electromagnetic wave in a red region, and the read-out electromagnetic wave is in a wavelength range of a near ultraviolet region to a blue region.

74. An electrostatic latent image read-out apparatus as defined in claim 71 in which the read-out exposure means causes a read-out electromagnetic wave in a form of a beam spot to scan the second conductive layer.

75. An electrostatic latent image read-out apparatus as defined in claim 74 in which the read-out exposure means projects the read-out electromagnetic wave like a pulse onto each pixel.

76. An electrostatic latent image read-out apparatus as defined in claim 71 in which said electrostatic recording member is an electrostatic recording member in which the second conductive layer is in a form of comb teeth, the read-out exposure means causes a line image of a read-out electromagnetic wave which is substantially uniform in intensity and extends substantially in perpendicular to the comb teeth to scan the second conductive layer in a longitudinal direction of the comb teeth, and the current detecting means detects the electric current flowing out of the electrostatic recording member tooth by tooth.

77. An electrostatic latent image read-out apparatus as defined in claim 76 in which said electrostatic recording member is an electrostatic recording member in which the second conductive layer is in a form of comb teeth, and the electrostatic latent image read-out apparatus is provided with a second connecting means which connects the second conductive layer to a third conductive layer.

78. An electrostatic latent image read-out apparatus as defined in claim 71 in which the current detecting means comprises an integrating capacitor which stores charge by the electric current flowing to the current detecting means, and a discharge means which selectively discharges the charge stored in the integrating capacitor, thereby detecting the charge stored in the integrating capacitor pixel by pixel.

79. An electrostatic latent image read-out apparatus as defined in claim 71 in which the current detecting means is connected to the first conductive layer by way of a bias power source having a predetermined DC voltage.

80. An electrostatic latent image read-out apparatus as defined in claim 79 in which the bias power source is the power source which is used when recording the electrostatic latent image.

* * * * *